US010670824B2

(12) United States Patent
Zimmel et al.

(10) Patent No.: US 10,670,824 B2
(45) Date of Patent: Jun. 2, 2020

(54) FIBER OPTIC NETWORK ARCHITECTURE USING HIGH FIBER-COUNT FIBER OPTIC CONNECTORS

(71) Applicant: CommScope Technologies LLC, Hickory, NC (US)

(72) Inventors: Steven C. Zimmel, Minneapolis, MN (US); Erik J. Gronvall, Bloomington, MN (US); Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/563,010

(22) PCT Filed: Apr. 1, 2016

(86) PCT No.: PCT/US2016/025664
§ 371 (c)(1),
(2) Date: Sep. 29, 2017

(87) PCT Pub. No.: WO2016/161341
PCT Pub. Date: Oct. 6, 2016

(65) Prior Publication Data
US 2018/0364436 A1 Dec. 20, 2018

Related U.S. Application Data

(60) Provisional application No. 62/142,093, filed on Apr. 2, 2015.

(51) Int. Cl.
*G02B 6/44* (2006.01)
*G02B 6/38* (2006.01)
*H04Q 11/00* (2006.01)

(52) U.S. Cl.
CPC .......... *G02B 6/4472* (2013.01); *G02B 6/389* (2013.01); *G02B 6/3831* (2013.01);
(Continued)

(58) Field of Classification Search
None
See application file for complete search history.

(56) References Cited

U.S. PATENT DOCUMENTS 4,478,487 A    10/1984   Obeissart
5,048,917 A     9/1991   Komatsu
(Continued)

FOREIGN PATENT DOCUMENTS

EP       1273994 A1    1/2003
WO    2008/076450 A1    6/2008
(Continued)

OTHER PUBLICATIONS

Extended European Search Report for European Patent Application No. 16774351.7 dated Nov. 16, 2018, 8 pages.
(Continued)

*Primary Examiner* — Michelle R Connelly
(74) *Attorney, Agent, or Firm* — Merchant & Gould P.C.

(57) ABSTRACT

A fiber optic network architecture for distributing service to local subscribers is disclosed. The architecture includes a plurality of high-fiber count cables connected end-to-end at connectorized coupling locations to form a main cable trunk. The connectorized coupling locations include high-fiber count pass-through connections for optically connecting optical fibers of adjacent ones of the high-fiber count cables end. The connectorized coupling locations also including high-fiber count branch connections for optically connecting optical fibers of the high-fiber count cables to branch locations.

11 Claims, 16 Drawing Sheets

(52) U.S. Cl.
CPC ......... *G02B 6/3883* (2013.01); *G02B 6/3885* (2013.01); *G02B 6/3879* (2013.01); *G02B 6/3897* (2013.01); *H04Q 11/0067* (2013.01)

(56) References Cited

U.S. PATENT DOCUMENTS

| | | | |
|---|---|---|---|
| 5,216,732 A * | 6/1993 | Knott | G02B 6/3847 385/56 |
| 5,317,663 A | 5/1994 | Beard et al. | |
| 5,344,333 A | 9/1994 | Haag | |
| 5,600,747 A * | 2/1997 | Yamakawa | G02B 6/3879 385/59 |
| 5,689,598 A | 11/1997 | Dean, Jr. et al. | |
| 5,788,122 A | 7/1998 | Giebel et al. | |
| 5,796,896 A | 8/1998 | Lee | |
| 6,062,740 A | 5/2000 | Ohtsuka et al. | |
| 6,146,023 A | 11/2000 | Weigel | |
| 6,259,856 B1 | 7/2001 | Shahid | |
| 6,325,547 B1 | 12/2001 | Cammons | |
| 6,364,539 B1 | 4/2002 | Shahid | |
| 6,409,394 B1 | 6/2002 | Ueda et al. | |
| 6,439,780 B1 * | 8/2002 | Mudd | G02B 6/3807 385/83 |
| 6,565,265 B2 | 5/2003 | Ohtsuka et al. | |
| 6,819,842 B1 | 11/2004 | Vogel et al. | |
| 7,077,577 B2 | 7/2006 | Trezza | |
| 7,645,162 B2 | 1/2010 | Kadar-Kallen et al. | |
| 7,744,286 B2 | 6/2010 | Lu et al. | |
| 7,744,288 B2 | 6/2010 | Lu et al. | |
| 7,751,672 B2 | 7/2010 | Smith et al. | |
| 7,758,389 B2 | 7/2010 | Kadar-Kallen et al. | |
| 7,762,726 B2 | 7/2010 | Lu et al. | |
| 7,816,602 B2 | 10/2010 | Landry et al. | |
| 7,844,158 B2 | 11/2010 | Gronvall et al. | |
| 7,942,510 B2 | 5/2011 | Shinada et al. | |
| 7,959,361 B2 | 6/2011 | Lu et al. | |
| 8,737,837 B2 | 5/2014 | Conner et al. | |
| 8,740,474 B2 | 6/2014 | Lu | |
| 8,920,043 B2 | 12/2014 | Iwaya et al. | |
| 9,519,114 B2 | 12/2016 | Zimmel | |
| 9,599,780 B2 | 3/2017 | Lu et al. | |
| 10,114,181 B2 | 10/2018 | Lu et al. | |
| 10,146,015 B2 | 12/2018 | Zimmel | |
| 2003/0002806 A1 | 1/2003 | Kang et al. | |
| 2004/0057671 A1 | 3/2004 | Kang et al. | |
| 2005/0281509 A1 | 12/2005 | Cox | |
| 2006/0133758 A1 | 6/2006 | Mullaney et al. | |
| 2007/0196053 A1 | 8/2007 | Kewitsch | |
| 2008/0089651 A1 | 4/2008 | Lewallen et al. | |
| 2008/0131056 A1 | 6/2008 | Isenhour et al. | |
| 2009/0074369 A1 | 3/2009 | Bolton | |
| 2010/0202736 A1 | 8/2010 | Roth | |
| 2010/0322554 A1 | 12/2010 | Barnes et al. | |
| 2011/0229083 A1 | 9/2011 | Dainese Junior et al. | |
| 2011/0249943 A1 | 10/2011 | Case et al. | |
| 2011/0311226 A1 | 12/2011 | Smith et al. | |
| 2012/0027355 A1 | 2/2012 | Leblanc et al. | |
| 2012/0093462 A1 | 4/2012 | Childers et al. | |
| 2012/0237168 A1 | 9/2012 | Aoki et al. | |
| 2013/0084045 A1 | 4/2013 | Aoki et al. | |
| 2013/0121645 A1 * | 5/2013 | Haley | G02B 6/3821 385/77 |
| 2013/0183005 A1 | 7/2013 | Lu | |
| 2013/0209041 A1 | 8/2013 | Szilagyi et al. | |
| 2013/0216186 A1 | 8/2013 | Ott | |
| 2013/0216189 A1 | 8/2013 | Grinderslev | |
| 2014/0072265 A1 | 3/2014 | Ott | |
| 2014/0241670 A1 | 8/2014 | Barnette | |
| 2014/0301701 A1 * | 10/2014 | Leigh | G02B 6/3879 385/71 |
| 2016/0004016 A1 * | 1/2016 | Zimmel | G02B 6/3885 385/59 |
| 2016/0161680 A1 | 6/2016 | Nguyen | |
| 2017/0199338 A1 * | 7/2017 | Leigh | G02B 6/3885 |
| 2017/0322386 A1 | 11/2017 | Morris | |

FOREIGN PATENT DOCUMENTS

| | | |
|---|---|---|
| WO | 2009/155487 A1 | 12/2009 |
| WO | 2010/093794 A1 | 8/2010 |
| WO | 2012106510 A1 | 8/2012 |
| WO | 2012125836 A2 | 9/2012 |
| WO | 2013077969 A1 | 5/2013 |
| WO | 2016004347 A1 | 1/2016 |
| WO | 2016007491 A1 | 1/2016 |

OTHER PUBLICATIONS

International Search Report and Written Opinion of the International Searching Authority for corresponding International Patent Application No. PCT/US2016/025664 dated Sep. 20, 2016, 15 pages.

Extended European Search Report for Application No. 15815522.6 dated Jan. 18, 2018.

International Search Report and Written Opinion for Application No. PCT/US2015/039350 dated Sep. 25, 2015.

Ohtsuka et al., Non-fixed Fiber-Portion-Compressed Type Multi-fiber PC Optical Connector, admitted as prior art as of Jul. 2, 2014, 2 pages.

Fujitsu Laboratories and Furukawa Electric Develop Low-Cost Multi-Fiber Optical Connector, Feb. 3, 2014, 3 pages.

Extended European Search Report for Application No. 15819276.5 dated Jan. 29, 2018.

* cited by examiner

FIG. 7

A-side Wiring, 432F cable — 250

| Ribbon No. | Fiber No. | | | | | | | | | | | | Conn No. | Ferrule No. | Ferrule position | | | | | | | | | | | |
|---|---|---|---|---|---|---|---|---|---|---|---|---|---|---|---|---|---|---|---|---|---|---|---|---|---|---|---|
| 1 | Bl | Or | Gr | Br | Sl | Wh | Re | Bl | Ye | Vi | Ro | Aq | Conn 1 | 1 | 1 | 2 | 3 | 4 | 5 | 6 | 7 | 8 | 9 | 10 | 11 | 12 |
| 2 | Bl | Or | Gr | Br | Sl | Wh | Re | Bl | Ye | Vi | Ro | Aq | | 1 | 13 | 14 | 15 | 16 | 17 | 18 | 19 | 20 | 21 | 22 | 23 | 24 |
| 3 | Bl | Or | Gr | Br | Sl | Wh | Re | Bl | Ye | Vi | Ro | Aq | | 2 | 1 | 2 | 3 | 4 | 5 | 6 | 7 | 8 | 9 | 10 | 11 | 12 |
| 4 | Bl | Or | Gr | Br | Sl | Wh | Re | Bl | Ye | Vi | Ro | Aq | | 2 | 13 | 14 | 15 | 16 | 17 | 18 | 19 | 20 | 21 | 22 | 23 | 24 |
| 5 | Bl | Or | Gr | Br | Sl | Wh | Re | Bl | Ye | Vi | Ro | Aq | | 3 | 1 | 2 | 3 | 4 | 5 | 6 | 7 | 8 | 9 | 10 | 11 | 12 |
| 6 | Bl | Or | Gr | Br | Sl | Wh | Re | Bl | Ye | Vi | Ro | Aq | | 3 | 13 | 14 | 15 | 16 | 17 | 18 | 19 | 20 | 21 | 22 | 23 | 24 |
| 7 | Bl | Or | Gr | Br | Sl | Wh | Re | Bl | Ye | Vi | Ro | Aq | | 4 | 1 | 2 | 3 | 4 | 5 | 6 | 7 | 8 | 9 | 10 | 11 | 12 |
| 8 | Bl | Or | Gr | Br | Sl | Wh | Re | Bl | Ye | Vi | Ro | Aq | | 4 | 13 | 14 | 15 | 16 | 17 | 18 | 19 | 20 | 21 | 22 | 23 | 24 |
| 9 | Bl | Or | Gr | Br | Sl | Wh | Re | Bl | Ye | Vi | Ro | Aq | | 5 | 1 | 2 | 3 | 4 | 5 | 6 | 7 | 8 | 9 | 10 | 11 | 12 |
| 10 | Bl | Or | Gr | Br | Sl | Wh | Re | Bl | Ye | Vi | Ro | Aq | | 5 | 13 | 14 | 15 | 16 | 17 | 18 | 19 | 20 | 21 | 22 | 23 | 24 |
| 11 | Bl | Or | Gr | Br | Sl | Wh | Re | Bl | Ye | Vi | Ro | Aq | | 6 | 1 | 2 | 3 | 4 | 5 | 6 | 7 | 8 | 9 | 10 | 11 | 12 |
| 12 | Bl | Or | Gr | Br | Sl | Wh | Re | Bl | Ye | Vi | Ro | Aq | | 6 | 13 | 14 | 15 | 16 | 17 | 18 | 19 | 20 | 21 | 22 | 23 | 24 |
| 13 | Bl | Or | Gr | Br | Sl | Wh | Re | Bl | Ye | Vi | Ro | Aq | Conn 2 | 1 | 1 | 2 | 3 | 4 | 5 | 6 | 7 | 8 | 9 | 10 | 11 | 12 |
| 14 | Bl | Or | Gr | Br | Sl | Wh | Re | Bl | Ye | Vi | Ro | Aq | | 1 | 13 | 14 | 15 | 16 | 17 | 18 | 19 | 20 | 21 | 22 | 23 | 24 |
| 15 | Bl | Or | Gr | Br | Sl | Wh | Re | Bl | Ye | Vi | Ro | Aq | | 2 | 1 | 2 | 3 | 4 | 5 | 6 | 7 | 8 | 9 | 10 | 11 | 12 |
| 16 | Bl | Or | Gr | Br | Sl | Wh | Re | Bl | Ye | Vi | Ro | Aq | | 2 | 13 | 14 | 15 | 16 | 17 | 18 | 19 | 20 | 21 | 22 | 23 | 24 |
| 17 | Bl | Or | Gr | Br | Sl | Wh | Re | Bl | Ye | Vi | Ro | Aq | | 3 | 1 | 2 | 3 | 4 | 5 | 6 | 7 | 8 | 9 | 10 | 11 | 12 |
| 18 | Bl | Or | Gr | Br | Sl | Wh | Re | Bl | Ye | Vi | Ro | Aq | | 3 | 13 | 14 | 15 | 16 | 17 | 18 | 19 | 20 | 21 | 22 | 23 | 24 |
| 19 | Bl | Or | Gr | Br | Sl | Wh | Re | Bl | Ye | Vi | Ro | Aq | | 4 | 1 | 2 | 3 | 4 | 5 | 6 | 7 | 8 | 9 | 10 | 11 | 12 |
| 20 | Bl | Or | Gr | Br | Sl | Wh | Re | Bl | Ye | Vi | Ro | Aq | | 4 | 13 | 14 | 15 | 16 | 17 | 18 | 19 | 20 | 21 | 22 | 23 | 24 |
| 21 | Bl | Or | Gr | Br | Sl | Wh | Re | Bl | Ye | Vi | Ro | Aq | | 5 | 1 | 2 | 3 | 4 | 5 | 6 | 7 | 8 | 9 | 10 | 11 | 12 |
| 22 | Bl | Or | Gr | Br | Sl | Wh | Re | Bl | Ye | Vi | Ro | Aq | | 5 | 13 | 14 | 15 | 16 | 17 | 18 | 19 | 20 | 21 | 22 | 23 | 24 |
| 23 | Bl | Or | Gr | Br | Sl | Wh | Re | Bl | Ye | Vi | Ro | Aq | | 6 | 1 | 2 | 3 | 4 | 5 | 6 | 7 | 8 | 9 | 10 | 11 | 12 |
| 24 | Bl | Or | Gr | Br | Sl | Wh | Re | Bl | Ye | Vi | Ro | Aq | | 6 | 13 | 14 | 15 | 16 | 17 | 18 | 19 | 20 | 21 | 22 | 23 | 24 |
| 25 | Bl | Or | Gr | Br | Sl | Wh | Re | Bl | Ye | Vi | Ro | Aq | Conn 3 | 1 | 1 | 2 | 3 | 4 | 5 | 6 | 7 | 8 | 9 | 10 | 11 | 12 |
| 26 | Bl | Or | Gr | Br | Sl | Wh | Re | Bl | Ye | Vi | Ro | Aq | | 1 | 13 | 14 | 15 | 16 | 17 | 18 | 19 | 20 | 21 | 22 | 23 | 24 |
| 27 | Bl | Or | Gr | Br | Sl | Wh | Re | Bl | Ye | Vi | Ro | Aq | | 2 | 1 | 2 | 3 | 4 | 5 | 6 | 7 | 8 | 9 | 10 | 11 | 12 |
| 28 | Bl | Or | Gr | Br | Sl | Wh | Re | Bl | Ye | Vi | Ro | Aq | | 2 | 13 | 14 | 15 | 16 | 17 | 18 | 19 | 20 | 21 | 22 | 23 | 24 |
| 29 | Bl | Or | Gr | Br | Sl | Wh | Re | Bl | Ye | Vi | Ro | Aq | | 3 | 1 | 2 | 3 | 4 | 5 | 6 | 7 | 8 | 9 | 10 | 11 | 12 |
| 30 | Bl | Or | Gr | Br | Sl | Wh | Re | Bl | Ye | Vi | Ro | Aq | | 3 | 13 | 14 | 15 | 16 | 17 | 18 | 19 | 20 | 21 | 22 | 23 | 24 |
| 31 | Bl | Or | Gr | Br | Sl | Wh | Re | Bl | Ye | Vi | Ro | Aq | | 4 | 1 | 2 | 3 | 4 | 5 | 6 | 7 | 8 | 9 | 10 | 11 | 12 |
| 32 | Bl | Or | Gr | Br | Sl | Wh | Re | Bl | Ye | Vi | Ro | Aq | | 4 | 13 | 14 | 15 | 16 | 17 | 18 | 19 | 20 | 21 | 22 | 23 | 24 |
| 33 | Bl | Or | Gr | Br | Sl | Wh | Re | Bl | Ye | Vi | Ro | Aq | | 5 | 1 | 2 | 3 | 4 | 5 | 6 | 7 | 8 | 9 | 10 | 11 | 12 |
| 34 | Bl | Or | Gr | Br | Sl | Wh | Re | Bl | Ye | Vi | Ro | Aq | | 5 | 13 | 14 | 15 | 16 | 17 | 18 | 19 | 20 | 21 | 22 | 23 | 24 |
| 35 | Bl | Or | Gr | Br | Sl | Wh | Re | Bl | Ye | Vi | Ro | Aq | | 6 | 1 | 2 | 3 | 4 | 5 | 6 | 7 | 8 | 9 | 10 | 11 | 12 |
| 36 | Bl | Or | Gr | Br | Sl | Wh | Re | Bl | Ye | Vi | Ro | Aq | | 6 | 13 | 14 | 15 | 16 | 17 | 18 | 19 | 20 | 21 | 22 | 23 | 24 |

FIG. 8

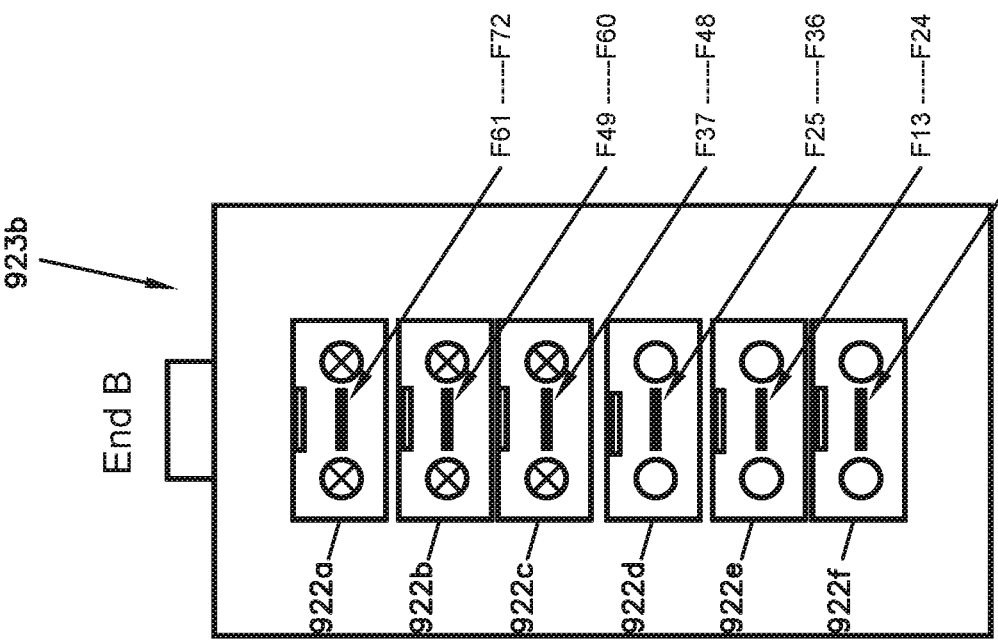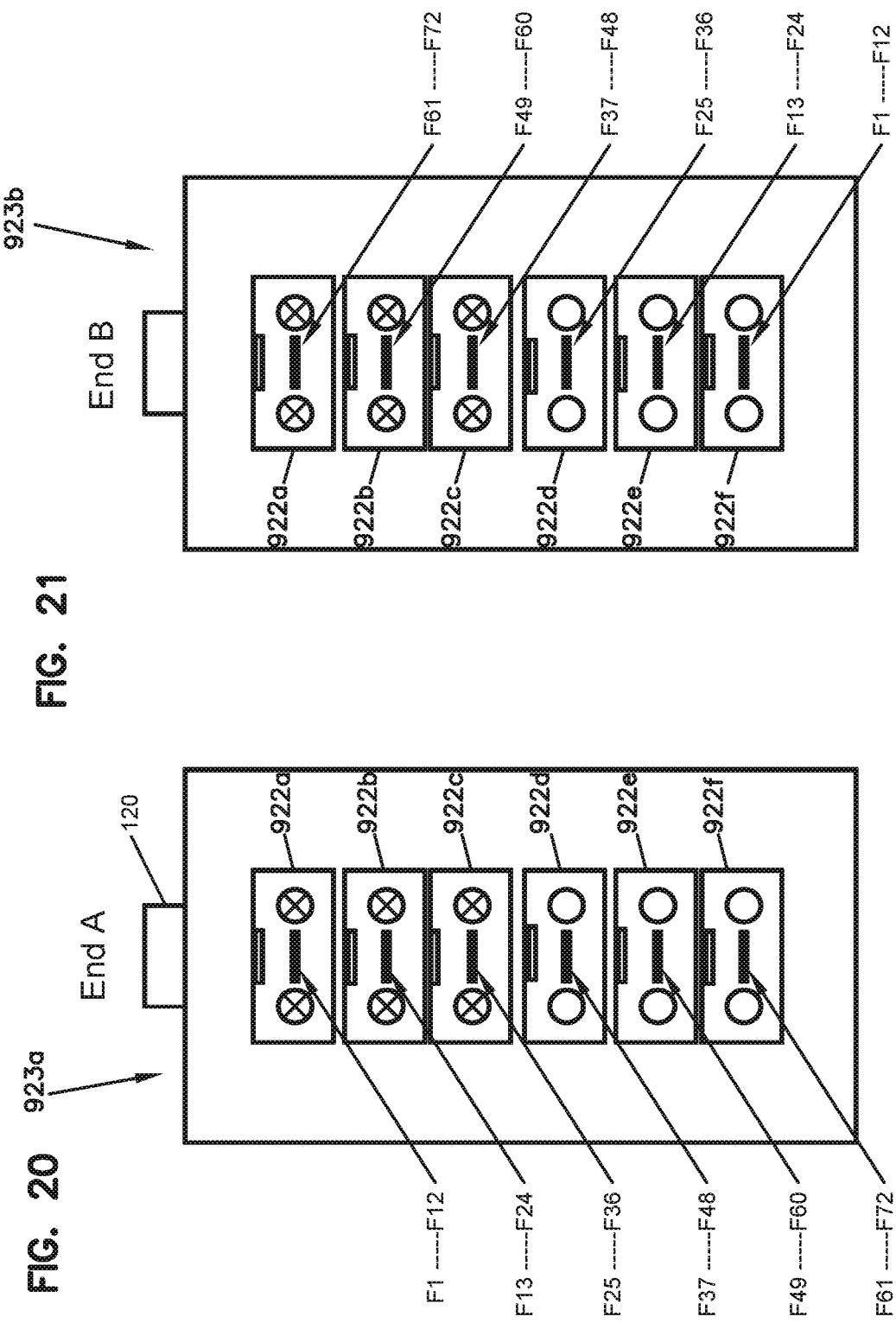

FIBER OPTIC NETWORK ARCHITECTURE USING HIGH FIBER-COUNT FIBER OPTIC CONNECTORS

CROSS-REFERENCE TO RELATED APPLICATION

This application is a National Stage Application of PCT/US2016/025664, filed on Apr. 1, 2016, which claims the benefit of U.S. Patent Application Ser. No. 62/142,093, filed on Apr. 2, 2015, the disclosures of which are incorporated herein by reference in their entireties. To the extent appropriate, a claim of priority is made to each of the above disclosed applications.

BACKGROUND

Fiber optic telecommunications technology has continued to expand as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals in one direction and convert electrical signals to optical signals in the opposite direction. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into electrical signals for use with the subscriber's devices. However, to the extent that an end user may have devices that are compatible with optical signals, conversion of the optical signals to electrical signals may not be necessary.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. A network of cables can be routed outwardly from the fiber distribution hub to subscriber locations. For example, fiber optic cables can be routed from the fiber distribution hub to drop terminals (i.e., multi-service terminals), and drop cables can be routed from the drop terminals to subscriber locations.

SUMMARY

Aspects of the present disclosure relate to fiber optic network architectures that use high-fiber count fiber optic connectors to simplify network installation operations thereby reducing network installation times and reducing network installation costs.

Aspects of the present disclosure relate to fiber optic network architectures that string together (e.g., daisy chain together) a plurality of high fiber-count fiber optic cables to form a main cable line. The high fiber-count fiber optic cables forming the main cable line are interconnected by connecting the high fiber-count fiber optic cables end-to-end at connection locations that include high fiber-count fiber optic connectors. In certain examples, high fiber-count fiber optic connectors of a first high fiber-count fiber optic cable are connected to high fiber-count fiber optic connectors of an adjacent second high fiber-count fiber optic cable at a first one of the connection locations. In certain examples, high fiber-count connectors of the first high fiber-count fiber optic cable are coupled to high fiber-count fiber optic connectors corresponding to fiber distribution hubs or other structures to allow signals to be branched off from the main cable line. In certain examples, the high fiber-count fiber optic connectors each accommodate at least 72 optical fibers or at least 144 optical fibers. In certain examples, a furcated fiber optic cable (e.g., a bifurcated fiber optic cable) is used to couple a high fiber-count fiber optic connector of the first high fiber-count fiber optic cable to both a high fiber-count fiber optic connector of the second high fiber-count fiber optic cable and to a high fiber-count fiber optic connector corresponding to a fiber distribution hub. In certain examples, the high fiber-count fiber optic connectors of the first and second high fiber-count fiber optic cables are configured such that either end of the first high fiber-count fiber optic cable can be connected to either end of the second high fiber-count fiber optic cable. Thus, during cable installation, it is not necessary to map or otherwise plan the orientation of each cable to ensure that adjacent ends of adjacent cables in a series are compatible with each other. Instead, the cables are configured such that adjacent ends of the cables will always be compatible with one another regardless of the cable end positioning thereby facilitating the installation process and reducing the likelihood of installation delays.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIGS. 7 and 8 provide routing charts specifying a routing scheme for routing the optical fiber ribbons that extend between the 144-fiber connectors of FIGS. 5 and 6, FIG. 7 corresponds to the connector of FIG. 5 and FIG. 8 corresponds to the connector of FIG. 6;

FIGS. 20 and 21 show example 72-fiber optic connectors that can be mounted at opposite ends of optical fiber ribbons routed through fiber optic cables utilized in the architecture of FIG. 19;

DETAILED DESCRIPTION

A. Example Network Architecture

Figure 1:
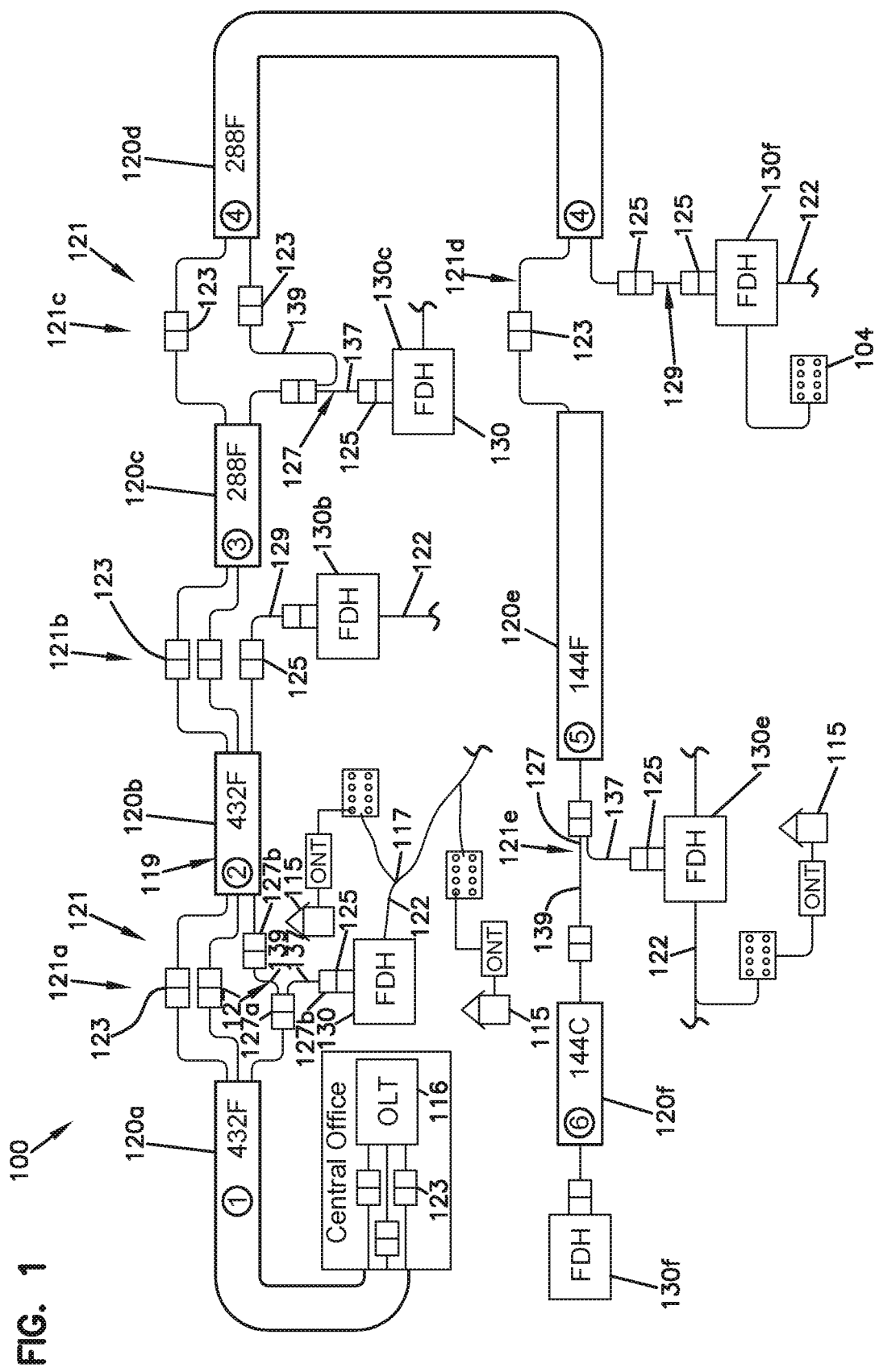
FIG. 1 schematically depicts a fiber optic architecture in accordance with the principles of the present disclosure.

FIG. 1 illustrates an example architecture for an optical network 100 in accordance with the principles of the present disclosure. As shown in FIG. 1, the network 100 is adapted to interconnect a central location such as a central office 110 to a number of end subscribers 115 (also called end users 115 herein). The central location may include optical line terminals (OLT's) 116 that interface with the optical network 100. The central office may include patch panels or cross-connect panels for allowing selective connection and disconnection of individual lines with particular equipment at the central office to provide customized service. The central office 110 may additionally connect to a larger network such as the Internet (not shown) and a public switched telephone network (PSTN). The various cables of the network can be routed aerially or routed through underground conduit.

In general, the optical network 100 provides communication between the central office 100 of a service provider and the plurality of subscribers 115. The optical network 100 includes a series high fiber-count fiber optic cables 120*a*-120*f* routed from the central office 110. The high fiber-count fiber optic cables 120*a*-120*f* can be coupled end-to-end in a daisy-chain fashion and can cooperate to define a main feeder cable trunk. The ends of the fiber high fiber-count fiber optic cables 120*a*-120*f* can be coupled at connectorized cable coupling locations 121. The connectorized cable coupling locations 121 can include high-fiber count connectorized pass-through connections 123 having mating high-fiber count fiber optic connectors that are interconnected to daisy chain the optical fibers of the high-fiber count fiber optic cables 120*a*-120*f* together to form the main cable trunk. In certain examples the mating high-fiber count connectorized pass-through connections 123 can include sealed and robust multi-fiber connectors that are rated for outdoor use or otherwise compatible with outdoor environmental conditions. Such connectors can include robust fastening elements such as threaded coupling nuts or sleeves or bayonet style fastening elements for securing mated connectors together or to an intermediate fiber optic adapter. Seals can be provided for sealing between mated connectors or for sealing between the connectors and an intermediate fiber optic adapter. In other examples, the high fiber-count connectorized pass-through connections 123 can be more suited for indoor conditions and can use indoor rated fiber optic connectors. In the case where indoor fiber optic connectors are used, the connectorized cable coupling locations 121 can each include a sealed closure or housing in which the indoor fiber optic connectors are housed. In certain examples, high-fiber count fiber optic connectors used at the high-fiber count connectorized pass-through connections 123 can each support at least 24 optical fibers, at least 48 optical fibers, at least 72 optical fibers or at least 144 optical fibers.

The main feeder cable trunk can form an F1 portion/region of the optical network 100. The optical network 100 can also include local distribution cables 122 that extend out from the main feeder cable trunk. The local distribution cables 122 can form an F2 portion/region of the optical network. Generally, the F2 portion of the optical network 100 is closer to the subscribers 115 than the F1 portion of the optical network 100. Local distribution cables are cables that are closer to the end users/subscribers than the main trunk cable.

The network 100 also may include fiber distribution hubs (FDHs) 130 that provide interface locations between the main feeder cable trunk and the local distribution cables 122. In general, an FDH 130 is an equipment enclosure that may include a plurality of passive optical splitters (e.g., 1-to-8 splitters, 1-to-16 splitters, or 1-to-32 splitters) for splitting fiber optic signal lines from main the incoming feeder fibers into a number of output distribution fibers corresponding to optical fibers of the local distribution cables 122. The local distribution cables 122 are routed from the FDH 130 to locations in close proximity to the end users 115.

The connectorized cable coupling locations 121 are also adapted to provide high-fiber count connectorized branch connections 125 between the main cable trunk and the FDH's 130 or other type of terminal. The high-fiber count connectorized branch connections 125 can include high-fiber count fiber optic connectors that each support at least 24 optical fibers, at least 48 optical fibers, at least 72 optical fibers or at least 144 optical fibers. In certain examples the mating high fiber-count connectorized branch connections 125 can include sealed and robust connectors that are rated for outdoor use or otherwise compatible with outdoor environmental conditions. Such connectors can include robust fastening elements such as threaded coupling nuts or sleeves or bayonet style fastening elements for securing mated connectors together or to an intermediate fiber optic adapter. Seals can be provided for sealing between mated connectors or for sealing between the connectors and an intermediate fiber optic adapter. In other examples, the high-fiber count branch connections 125 can be more suited for indoor conditions.

The local distribution cables 122 can have a variety of different types of configurations. As depicted at FIG. 1, the local distribution cables 122 include a plurality of breakout locations 117 at which optical fibers are separated out from and optically coupled to trunks of the local distribution cables 122. At a breakout location, fibers from the trunk of the local distribution cable 122 can be broken out and connectorized to form a branch such as a connectorized tether. In other embodiments, fibers of the trunk of the local distribution cable can be broken out and spliced to a length of optical fiber having a connectorized free end so as to form a connectorized tether. The tethers can be connected to drop terminals 104. In other examples, the local distribution cables 122 may simply terminate at access terminals (e.g., drop terminals 104) having one or more connection locations (e.g., ports, fiber optic adapters, fiber optic connectors, splice locations, etc.) for connecting drop cables to subscriber locations (e.g., ONT's at the subscriber locations) without having any intermediate/mid-span break-outs.

As described above, in some embodiments, local distribution cables may not employ mid-span breakouts. Instead, a local distribution cable cables may be run from an FDH to a drop terminal such that one end of the local distribution cable is located at the FDH and the other end of the F2 cable is located at the drop terminal. For such an embodiment, the local distribution cable may include the same number of optical fibers as the number of access ports provided on the drop terminal. For such an embodiment, an excess length of the F2 cable can be stored on a spool provided at the drop terminal as described at U.S. Patent Application Ser. No. 61/098,494, which is hereby incorporated by reference. In other embodiments, an optical splitter may be provided in the drop terminal so that the drop terminal can have more access ports than the number of optical fibers fed to the drop terminal from the corresponding local distribution cable.

B. Example Fiber Distribution Hub

Figure 2:
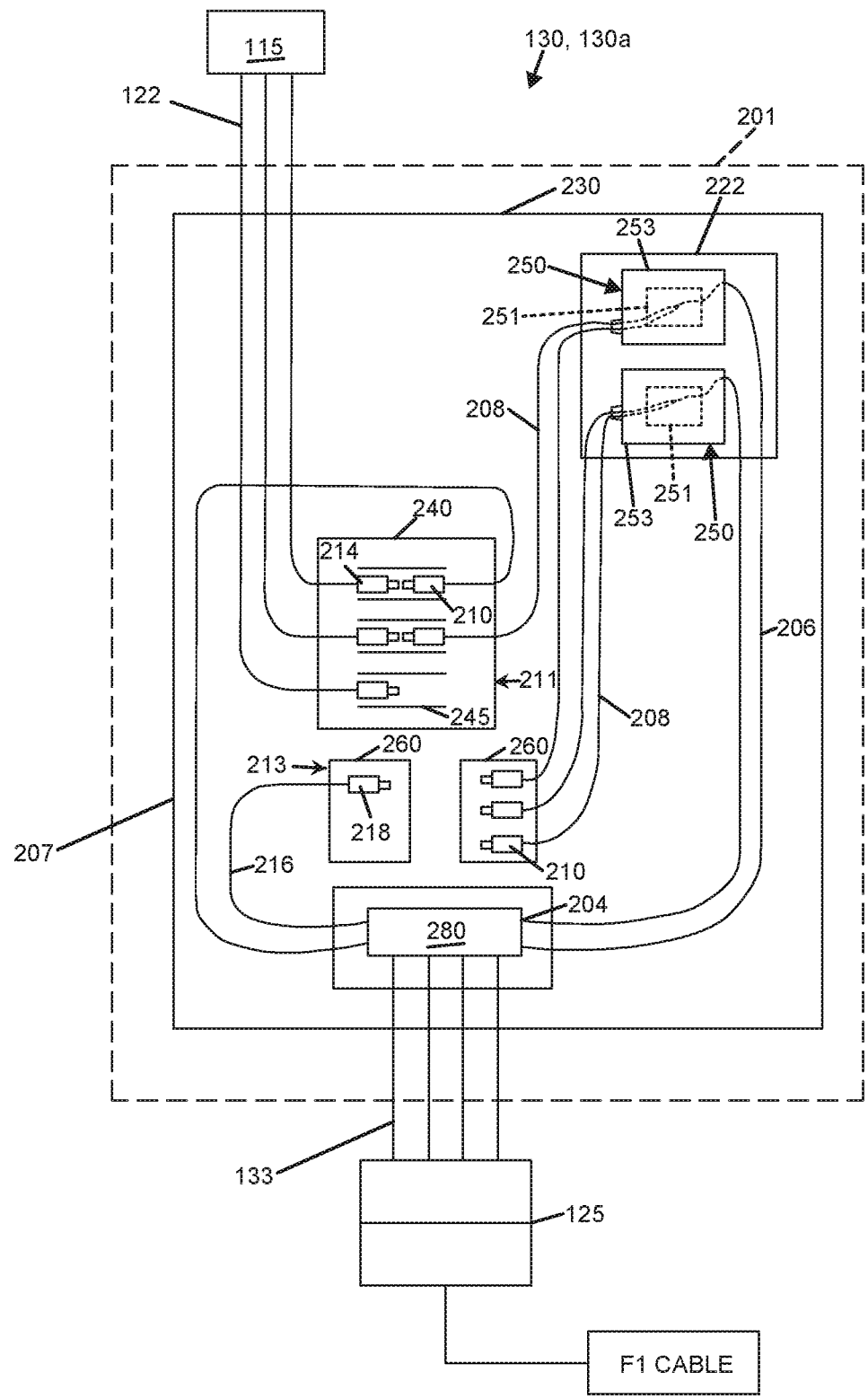
FIG. 2 schematically depicts a fiber distribution hub that can be incorporated into the architecture of FIG. 1.

FIG. 2 is a schematic diagram showing an example lay out that can be used for the FDHs 130 in the network of FIG. 1. Each FDH 130 generally administers connections at a termination region 211 between incoming fibers (e.g., fibers optically coupled to the high fiber-count cables 120a-120f) and outgoing fibers (e.g., fibers optically coupled to subscriber locations 115 typically corresponding to local distribution cables) in an Outside Plant (OSP) environment. The FDH 130 provides an interconnect interface for optical transmission signals at a location in the network where operational access and reconfiguration are desired. For example, the FDH 130 can be used to split (e.g., passively power split) the signals from the high fiber-count fiber optic cables 120a-120f and direct the split signals to the local distribution cables routed toward the subscriber locations 115. In some cases, optical signals from the high fiber-count fiber optic cables 120a-120f may pass through the FDH 130 and be directed to a subscriber location without being power split. In addition, the FDH 130 may be designed to accommodate a range of alternative sizes and fiber counts and support factory installation of pigtails 208, fanouts, and splitter modules 250. Wavelength division multiplexers (e.g., coarse or dense wavelength division multiplexers) can also be provided within the FDH 130 for separating/dividing optical signals based on wavelength.

As shown at FIG. 1, the high fiber-count fiber optic cables 120a-120f can be coupled to their respective FDH 130 by patch cords. The patch cords can have a furcated configuration (e.g., bifurcated as shown by patch cords 127) or a single-ended configuration (e.g., see patch cord 129). The connectorized ends of the patch cords can couple to the high fiber-count fiber optic connectors of the high-fiber count fiber optic cables 120a-120f and can also couple to high fiber-count fiber optic connectors corresponding to the FDH's 130. The high fiber-count fiber optic connectors can be mounted at external walls of housings of the FDH's 130 or mounted within fiber optic adapters mounted through the external walls so as to form connections locations (e.g., ports) accessible from outside the FDH housings. The high-fiber count fiber optic connectors can also be positioned inside the housings of the FDH's 130. In certain examples, the high fiber-count fiber optic connectors can be mounted at the ends of stub cables 133 routed within the FDH's 130. The stub cables can be positioned completely inside the FDH's or can have connectorized ends that extend outside the FDH's. The stub cables 133 can include 12 fiber ribbons.

FIG. 2 shows an example one of the stub cables 133 having a free end terminated by one of the high fiber-count fiber optic connectors for providing a connectorized branch connection 125 and an opposite end routed to a connection interface 280 (e.g., fiber optic adapter modules including fiber optic adapters for single fiber connectors, fiber optic adapters for interconnecting multi-fiber connectors such as 24 or 12-fiber MPO connectors, a splice tray, etc.) within the FDH 130. At the interface 280, one or more of the fibers of the stub cable 133 are optically connected to splitter input fibers 206. The splitter input fibers 206 can be routed from the interface 280 to a splitter mounting location 222 at which a plurality of the splitter modules 250 can be mounted. In certain embodiments, the interface 280 can be located at the splitter mounting location 222 such that the splitter modules plug directly into the feeder cable interface (e.g., see U.S. Pat. No. 7,418,181 that is hereby incorporated by reference). Each splitter module 250 includes at least one fiber optic splitter 251 (e.g., a passive optical power splitter) positioned within a splitter housing 253. At the splitter mounting location 222, the splitter input fibers 206 are optically connected to separate splitter modules 250, wherein the input fibers 206 are each split by the fiber optic splitters 251 of the splitter modules 250 into multiple pigtails 208, each having a connectorized end 210.

At the interface 280, optical fibers of the stub cable 133 may also be optically connected to pass-through fibers 207. Pass-through fibers allow signals from the main trunk cables to pass through the FDH to the local distribution cables without being optically power split. The depicted pass-through fiber 207 by-passes the optical splitters and is routed to the termination region 211 for connection to a corresponding optical fiber of one of the local distribution cables 122.

When splitter pigtails and pass-through pigtails are not in service, their connectorized ends can be temporarily stored on a storage module 260 that is mounted at a storage region 213 of the FDH. When the pigtails are needed for service, the pigtails are routed from storage region to a termination module 240 or other structure that is provided at the termination region 211. At the termination region 211, the connectorized ends 210 of the pigtails can be connected to connectorized ends 214 of the fibers of the local distribution cables 122 by fiber optic adapters 245. The termination region 211 can be the dividing line between the incoming fibers and the outgoing fibers. An example local distribution cable 122 can forms the F2 portion of a network (see FIG. 1) and typically includes a plurality of fibers (e.g., 72, 144, 216, 432 fibers or other fiber counts) that are routed from the FDH 130 toward subscriber locations 115. Example FDH's are disclosed at U.S. patent application Ser. Nos. 11/544,951 and 12/241,576 that are hereby incorporated by reference.

C. Example Drop Terminal

Figure 3:
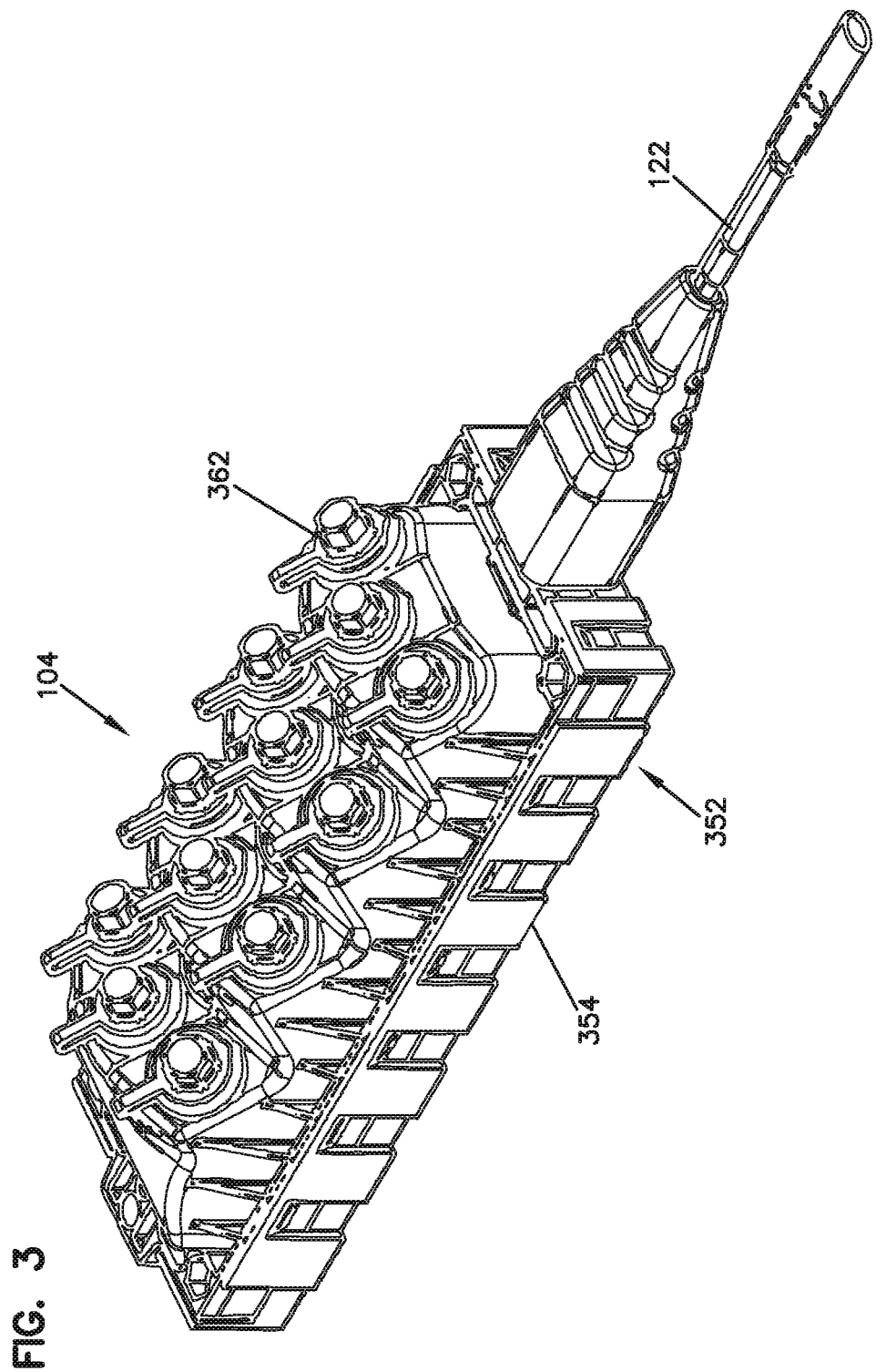
FIG. 3 depicts a drop terminal that can be incorporated into the architecture of FIG. 1.
Figure 4:
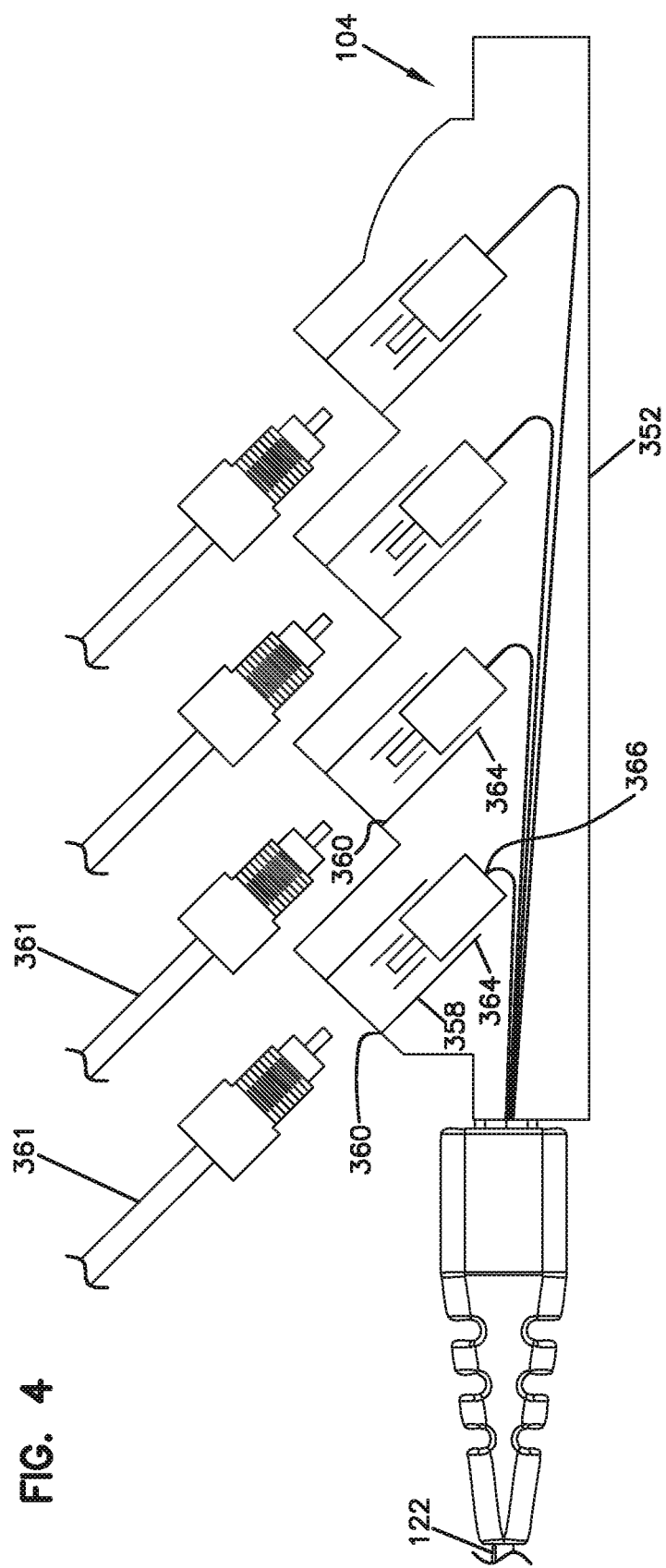
FIG. 4 is another view of the drop terminal of FIG. 3.

FIGS. 3 and 4 show an example configuration for the drop terminals 104 used in the network of FIG. 1. The drop terminal configuration includes a housing 352. A plurality of fiber optic adapters 358 are mounted to the housing 352. The adapters 358 include sealed, exterior ports 360 that are accessible from the outside of the housing 352. In use, connectorized ends of drop cables 361 can be inserted into the exterior ports 360 to connect the drop cables to the network. The exterior ports 360 are enclosed by plugs 362 when not connected to drop cables. The fiber optic adapters 358 also include interior ports 364 that are accessible from inside the housing 352. The interior ports 364 receive interior fiber optic connectors 366 (e.g., standard SC connectors as disclosed at U.S. Pat. No. 5,317,663, which is hereby incorporated by reference) that are mounted to the ends of fibers 371 corresponding to a fiber optic cable 367 (e.g., a local distribution cable) that is routed into the interior of the housing 352. Further details about the drop terminal configuration can be found in U.S. application Ser. No. 12/248,564, which is hereby incorporated by reference in its entirety.

D. Cabling and Connectorization

Referring to FIG. 1, the high fiber-count fiber optic cables 120a-120f are daisy-chained together to form a main cable trunk 119 that extends in an upstream-to-downstream direction as the main trunk extends away from a centralized location of a service provider (e.g., a central office). In other words, a "downstream" direction is defined as extending generally away from the provider location and toward the subscriber locations, and an "upstream" direction is defined as extending generally toward the provider location and generally away from the subscriber locations.

The connectorized coupling locations 121 of the optical network 100 serve two basic purposes. First, the coupling locations 121 provide high-fiber count connectorized pass-through connections 123 for optically connecting together the ends of adjacent high fiber-count fiber optic cables 120a-120f so that the high fiber-count fiber optic cables 120a-120f can be strung together end-to-end. The connections are formed by mating high fiber-count connectors that may each support a high number of optical fibers such as 144, 72 or 24 optical fibers. Second, the coupling locations 121 allow for a certain number of optical fibers to be branched (i.e., dropped out, separated, segregated, broken out, etc.) from the main cable trunk and directed toward terminals such as fiber distribution hubs 130. In certain examples, the coupling locations 121 can provide high-fiber count connectorized branch connections 125 for coupling certain optical fibers from the main cable trunk to a corresponding fiber distribution hub positioned near the coupling location 121.

It will be appreciated that the number of active fibers present in the high fiber-count fiber optic cables 120a-120f gradually/incrementally reduces as the main cable trunk 119 extends in a downstream direction. This gradual/incremental reduction in the number of active fibers is the result of fibers being branched from the main cable trunk 119 at each of the coupling locations 121. In the depicted configuration of FIG. 1, the coupling locations 121 can include five coupling locations 121a-121f.

Referring to FIG. 1, the cable 120b has fewer active fibers than the cable 120a with the reduction in the number of active fibers being equal to the number of fibers separated from the main cable trunk at the coupling location 121a and routed to fiber distribution hub 130a. The cable 120c has fewer active fibers than the cable 120b with the reduction in the number of active fibers being equal to the number of fibers separated from the main cable trunk at the coupling location 121b and routed to fiber distribution hub 130b. The cable 120d has fewer active fibers than the cable 120c with the reduction in the number of active fibers being equal to the number of fibers separated from the main cable trunk at the coupling location 121c and routed to fiber distribution hub 130c. The cable 120e has fewer active fibers than the cable 120d with the reduction in the number of active fibers being equal to the number of fibers separated from the main cable trunk at the coupling location 121d and routed to fiber distribution hub 130d. The cable 120f has fewer active fibers than the cable 120e with the reduction in the number of active fibers being equal to the number of fibers separated from the main cable trunk at the coupling location 121e and routed to fiber distribution hub 130e. The active fibers of the cable 120f are optically coupled to the fiber distribution hub 130f by a high-fiber count connectorized pass-through connection.

To promote manufacturing efficiency and inventory management, selected ones of the cables 120a-120e can have the same optical fiber counts and connectorization schemes. For example, certain adjacent cable pairs can have the same fiber counts with the downstream cable of the pair having a set of dark fibers equal in number to the number of fibers broken out at the coupling location between the adjacent cables. In the depicted example of FIG. 1, cables 120a and 120b have identical fiber counts and connectorization schemes, cables 120c and 120d have identical fiber counts and connectorization schemes, and cables 120e and 120f have identical fiber counts and connectorization schemes.

In one example, each of the cables 120a, 120b can include 432 fibers arranged in a ribbon stack having thirty-six 12-fiber ribbons with the ends of the optical fibers being terminated by three of the high fiber-count fiber optic connectors for providing the pass-through connections 123 and/or branch connections 125. It will be appreciated that the high fiber-count connectors at the connections 123 or 125 can include mating 144 fiber optic connectors. While the fiber counts of the high fiber-count fiber optic cables 120a, 120b can be identical, the high fiber-count fiber optic cables 120a, 120b can have different number of active fibers. For example, the high fiber-count fiber optic cable 120a can include 432 active fibers, while the high fiber-count fiber optic cable 120b can have a number of active fibers equal to 432 fibers subtracted by the number of fibers broken out from the main fiber trunk to the fiber distribution hub 130a at the coupling location 121a. In certain examples, 72 fibers can be broken out from the main fiber trunk at the coupling location 121a and branched to the fiber distribution hub 130a. Thus, while the high fiber-count fiber optic cable 120b includes 432 fibers, 72 of the fibers will be dark (i.e., inactive). For example, fiber numbers 361-432 may be dark in the fiber optic cable 120b.

In one example, each of the cables 120c, 120d can include 288 fibers arranged in a ribbon stack having twenty-four 12-fiber ribbons with the ends of the optical fibers being terminated by two high fiber-count fiber optic connectors. The connectors can be used to the form the high fiber count pass-through connections 123 and/or the branch connections 125. The fiber count of each of the cables 120c, 120d equals the number of fibers present in the cable 120a subtracted by the number of fibers broken out at the upstream coupling locations 121a, 121b. It will be appreciated that the high fiber-count fiber optic connectors forming the connections 123, 125 can each accommodate 144 fibers. While the fiber counts of the high fiber-count fiber optic cables 120c, 120d can be identical, the high fiber-count fiber optic cables 120c, 120d can have different number of active fibers. For example, the high fiber-count fiber optic cable 120c can include 288 active fibers, while the high fiber-count fiber optic cable 120d can have a number of active fibers equal to 288 fibers subtracted by the number of fibers broken out from the main fiber trunk to the fiber distribution hub 130c at the coupling location 120c. In certain examples, 72 fibers can be broken out from the main fiber trunk at the coupling location 121c and branched to the fiber distribution hub 130c. Thus, while the high fiber-count fiber optic cable 120d includes 288 fibers, 72 of the fibers will be dark (i.e., inactive). For example, fiber numbers 216-288 may be dark in the fiber optic cable 120d.

In one example, each of the cables 120e, 120f can include 144 fibers arranged in a ribbon stack having twelve 12-fiber ribbons with the ends of the optical fibers being terminated by single high fiber-count fiber optic connectors. The connectors can be used to the form the high fiber count pass-through connections 123 and/or the branch connections 125. The fiber count of each of the cables 120e, 120f equals the number of fibers present in the cable 120a subtracted by the number of fibers broken out at the upstream coupling locations 121a-121d. It will be appreciated that the high fiber-count fiber optic connectors forming the connections 123, 125 can each accommodate 144 fibers. While the fiber counts of the high fiber-count fiber optic cables 120e, 120f can be identical, the high fiber-count fiber optic cables 120e, 120f can have different number of active fibers. For example, the high fiber-count fiber optic cable 120e can include 144 active fibers, while the high fiber-count fiber optic cable 120f can have a number of active fibers equal to 144 fibers subtracted by the number of fibers broken out from the main fiber trunk to the fiber distribution hub 130e at the coupling location 120c. In certain examples, 72 fibers can be broken out from the main fiber trunk at the coupling location 121e and branched to the fiber distribution hub 130e. Thus, while the high fiber-count fiber optic cable 120f includes 144 fibers, 72 of the fibers will be dark (i.e., inactive). For example, fiber numbers 73-144 may be dark in the fiber optic cable 120f. The downstream end of the cable 120f is coupled to the FDH 130f.

Referring back to FIG. 1, one end of the fiber optic cable 120a is connected to the central office via high-fiber connectorized pass-through connections 123, and the other end of the fiber optic cable 120a interfaces with the downstream fiber optic cable 120b and the FDH 130a at the coupling location 121a. The optical connections 123 between the ends of the cables 120a, 120b are made by direct connector-to-connector couplings using the fiber optic connectors mounted at corresponding ends of the fiber optic cables 120a, 120b. A furcated patch cord 127 is used at the coupling location 121a to optically connect some fibers of the fiber optic cable 120a to the fiber distribution hub 130a and other fibers of the fiber optic cable 120a to the fiber optic cable 120b. The furcated patch cord 127 includes an upstream fiber optic connector 127a and two downstream fiber optic connectors 127b. The upstream fiber optic connector 127a has a higher fiber count than each of the downstream fiber optic connectors 127b. The connector 127a connects to the downstream end of the cable 120a. The downstream fiber optic connectors 127b connect to corresponding fiber optic connectors provided at the fiber distribution hub 130a and at the upstream end of the fiber optic cable 120b. The furcated patch cord 127 includes a branch leg 137 that extends from the upstream fiber optic connector 127a to the FDH 130a and a pass-through leg 139 that extends from the upstream fiber optic connector 127a to the upstream end of the fiber optic cable 120b. In certain examples, the downstream connectors 127b of the furcated patch cord 127 each support half the number of optical fibers as compared to the upstream connector 127a. In one example, the upstream fiber optic connector 127a of the furcated patch cord 127a supports 144 fibers while each of the downstream fiber optic connectors 127b support 72 fibers.

At the coupling location 121b, a downstream end of the fiber optic cable 120b is optically coupled to an upstream end of the fiber optic cable 120c. In certain examples, selected fibers of the fiber optic cable 120b are optically connected to selected fibers of the fiber optic cable 120c by the high-fiber count connectorized pass-through connections 123 which may be formed by mating high-fiber count optical connectors (e.g., 144 fiber connectors). In certain examples, selected fibers of the fiber optic cable 120b are also coupled to the fiber distribution hub 130b by a patch cord 129 (e.g., a non-furcated patch cord). Opposite ends of the patch cord 129 are terminated by high fiber-count fiber optic connectors. An upstream end of the patch cord 129 couples to selected fibers of the fiber optic cable 120b and a downstream end of the patch cord 129 couples to the FDH 130b.

The pass-through leg 139 of the furcated patch cord 127 may have fewer fibers than the mated downstream connector of the fiber optic cable 120b. Thus, a certain number of the optical fibers of the fiber optic cable 120b corresponding to the fiber optic connector mated to the pass-through leg 139 may be dark. In certain examples, half of the fibers of the fiber optic connector mated to the pass-through leg 139 may be dark. It will be appreciated that the upstream end of the patch cord 129 can be connected to a fiber optic connector 123a that is associated with dark fibers. For example, half of the optical fibers corresponding to the fiber optic connector 123a may be dark fibers. In certain examples, the patch cord 129 can have a reduced number of optical fibers that matches a number of active fibers corresponding to the mating connector 123a. In other examples the patch cord 129 can have a number of optical fibers that matches a total number of fibers of the connector 123a and certain fibers of the patch cord 129 may therefore be dark.

The coupling location 121c is located between the downstream end of the fiber optic cable 120c and the upstream end of the fiber optic cable 120d. At the coupling location 120c, a connection configuration similar to the one used at the coupling location 121a can be used. For example, certain optical fibers of the fiber optic cable 120c can be directly connected to corresponding optical fibers of the fiber optic cable 120d by connectorized high-fiber count optical connections 123. All of the optical fibers corresponding to this connection are active. Additionally, a furcated patch cord 127 can be used to connect fibers of the fiber optic cable 120c to the fiber distribution hub 130c and to connect other fibers to the fiber optic cable 120d. The fiber optic connector of the pass-through leg 139 of the furcated patch cord 127 has fewer fibers than the mating connector located at the upstream end of the cable 120d. Thus, certain optical fibers corresponding to the mated connector are dark. In one example, half of the optical fibers (e.g., 72) of the fiber optic connector are dark. Branch leg 137 is routed to the fiber distribution hub 130c.

Coupling location 120d is located between the downstream end of the fiber optic cable 120d and the upstream end of the fiber optic cable 120e. The coupling location 121d has a configuration similar to the one described with respect to the coupling location 121b. Specifically, a non-furcated patch cord 129 is used to provide a branch connection between the fiber optic cable 120d and the FDH 130d. Also, a direct connection via high-fiber count connectorized pass-through connections 123 is also used to connect optical fibers of the fiber optic cable 120*d* to corresponding fibers of the fiber optic cable 120*e*.

The coupling location 121*e* is located between the downstream end of the fiber optic cable 120*e* and the upstream end of the fiber optic cable 120*f*. The coupling location 120*e* uses a furcated patch cable 127 to connect some of the fibers of the fiber optic cable 120*e* to the fiber optic cable 120*f* and to connect the remainder of the fibers of the fiber optic cable 120*e* to the FDH 130*e*. The downstream end of the cable 120*f* connects directly to the FDH 130*d*. Because fibers have been branched out at the coupling location 120*e*, it will be appreciated that certain fibers of the fiber optic cable 120*f* are dark. For example, when 72 fibers are branched out at the coupling location 120*e*, then only 72 fibers are active in the fiber optic cable 120*f* and the remainder are dark.

It will be appreciated that the connectors at opposite ends (e.g., at "A" and "B" ends) of the cables 120*a*-120*f* can have identical mechanical interfaces and can be intermateable with one another. In this way, the cables 120*a*-120*f* can be installed in the field without concern for which ends (i.e., "A" or "B") are ultimately positioned adjacent to one another. In this way, regardless of how the cables are laid out, the adjacent ends of the cables 120*a*-120*f* will be compatible with one another. In other words, "A" ends can be connected to "A" ends, "B" ends can be connected to "B" ends, and "A" ends can be connected to "B" ends.

Figure 5:
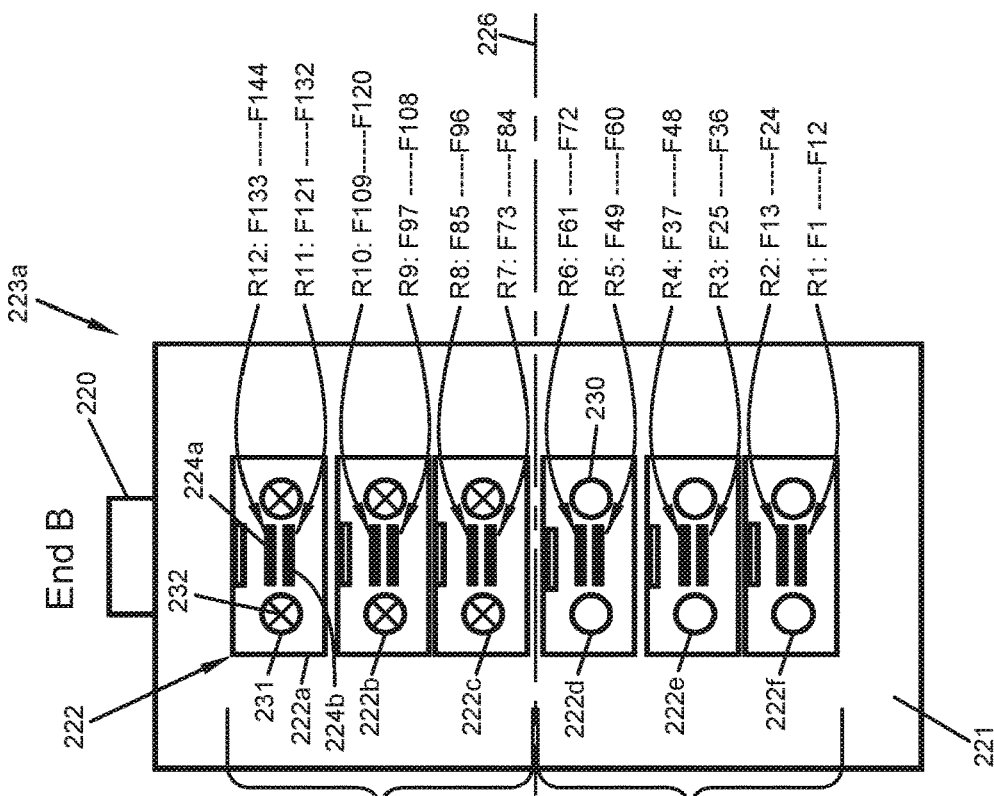
FIGS. 5 and 6 show 144-fiber optical connectors for supporting opposite ends of optical fiber ribbons routed through fiber optic cables of the architecture of FIG. 1.
Figure 6:
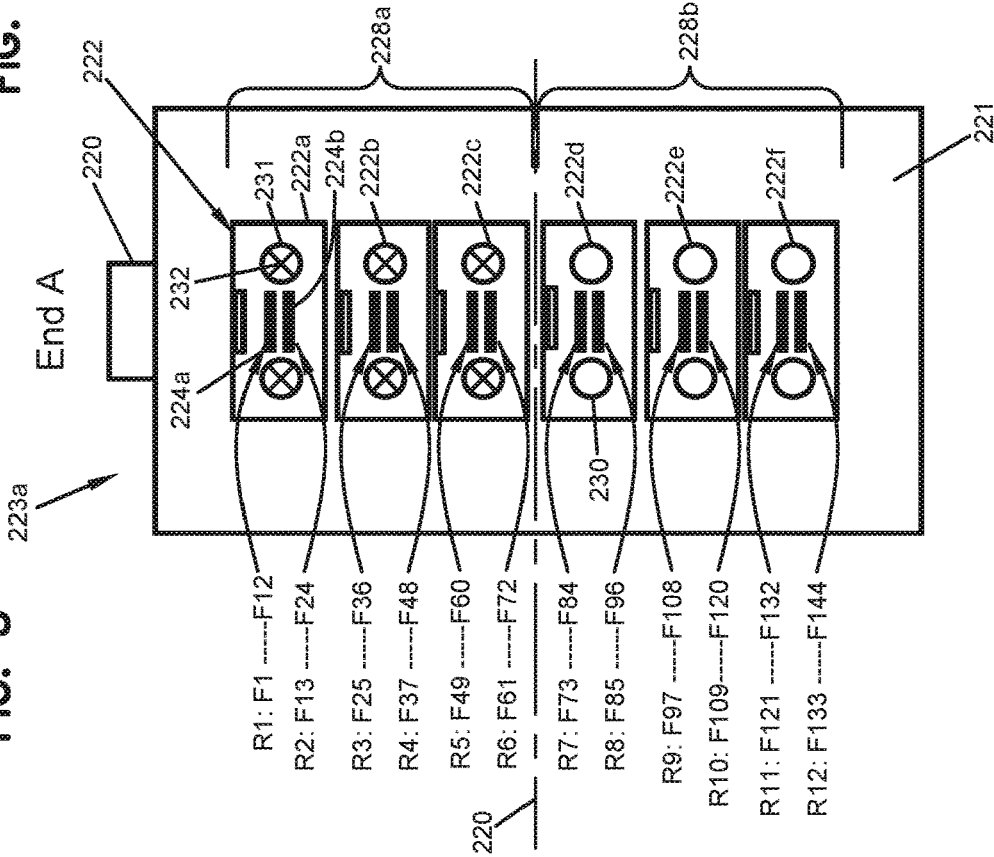

FIGS. 5 and 6 show the end faces of two fiber optic connectors 223*a*, 223*b* that can be positioned at opposite A and B ends of a given one of one of the cables 120*a*-120*f* and that are optically connected to one another by optical fibers routed through the given one of the fiber optic cables 120*a*-120*f*. The connectors 223*a*, 223*b* can have identical mechanical interfaces and can be inter-mated with one another. The fiber optic connectors 223*a*, 223*b* include mechanical interfaces having one or more alignment structures 220 for establishing a desired rotational orientation when mated with a corresponding fiber optic adapter. In certain examples, the alignment structures 220 can include keys such as projections or recesses. The fiber optic connectors 223*a*, 223*b* also include connector bodies 221 supporting a plurality of ferrules 222 that support end portions of optical fibers of the corresponding fiber optic cable. In one example, the ferrules 222 are twenty-four fiber ferrules each supporting the end portions of twenty-four separate optical fibers. In certain examples, the end portions of the optical fibers are arranged in two parallel rows 224 each including 12 separate optical fibers. In the embodiment of FIGS. 5 and 6, the connectors 223*a*, 223*b* each include six ferrules 222*a*-222*f* arranged in a defined configuration relative to the mechanical interface. In certain examples, the ferrules 222*a*-222*f* are arranged consecutively in a row with each of the ferrules 222*a*-222*f* arranged at a predefined location relative to the mechanical interface.

In the embodiment of FIGS. 5 and 6, the ferrules 222*a*-222*f* can be separated into two separate groups positioned on opposite sides of reference planes 226 that generally bisect the end faces of the fiber optic connector 223*a*, 223*b*. The groups of ferrules 222 can include a first group 228*a* positioned on one side of the reference plane 226 and a second group 228*b* positioned on the opposite side of the reference plane 226. The first group 228*a* can include ferrules 222*a*-222*c* and the second group 228*b* can include ferrules 222*d*-222*f*. The ferrules of the second group 228*b* can include vacant pin openings 230 while the ferrules of the first group 228*a* can include occupied pin openings 231. The occupied pin openings 231 support alignment pins 232 having base ends mounted within the occupied pin openings 231 such that the alignment pins 232 are fixed within the occupied pin openings 231. In the drawings, each alignment pin has been identified with an "X" while each vacant pin opening has been identified with an "O".

It will be appreciated that the connectors 223*a* or 223*b* at adjacent ends of the cables 120*a*-120*f* can be joined together by a suitable fiber optic adapter having opposite ports for receiving the connectors desired to be coupled together. The fiber optic adapter has keys or key receivers at each port are offset 180 degrees from one another about a central axis of the adapter (e.g., the key or key receiver at one port is up and the key or key receiver at the other port is down). Thus, mated connectors 223*a* or 223*b* are flipped 180 degrees relative to one another about their central axes by the fiber optic adapter such that free ends of the alignment pins 232 of the connectors 223*a*, 223*b* mate with the vacant pin openings 230 of the connectors 223*a*, 223*b* when the connectors 223*a*, 223*b* are coupled together.

The rows 224 of each ferrule 222 include an upper row 224*a* and a lower row 224*b*. The connectors 223*a*, 223*b* are each suited for supporting 144 optical fibers. The optical fibers are preferably arranged in ribbons within their corresponding cables 120*a*-120*f* with each ribbon including 12 fibers. Thus, within a given one of the fiber optic cables 120*a*-120*f*, twelve ribbons are R1-R12 are routed through the cable between the corresponding fiber optic connectors 223*a*, 223*b* respectively at the opposite A and B ends of the cable. In certain examples, the ribbons are routed using a polarity type A routing configuration. For example, ribbon R1 is routed from the top row 224*a* of ferrule 222*a* of the connector 223*a* to bottom row 224*b* of ferrule 222*f* of the connector 223*b*. Ribbon R12 is routed from the bottom row 224*b* of ferrule 222*f* of the connector 223*a* to top row 224*a* of the ferrule 222*a* of the connector 223*b*. Thus, ribbons R1 and R2 are routed to symmetrically opposite ferrule positions with regard to the reference plane 226 within the fiber optic connectors 123 at opposite ends of the cable. It will be appreciated that the remaining optical fiber ribbons R2-R11 are similarly routed from ferrule positions on symmetrically opposite sides of the reference plane 226. FIGS. 5 and 6 show a fiber layout for each of the connectors 223*a*, 223*b* on opposite A and B ends of a given cable.

Figure 8:
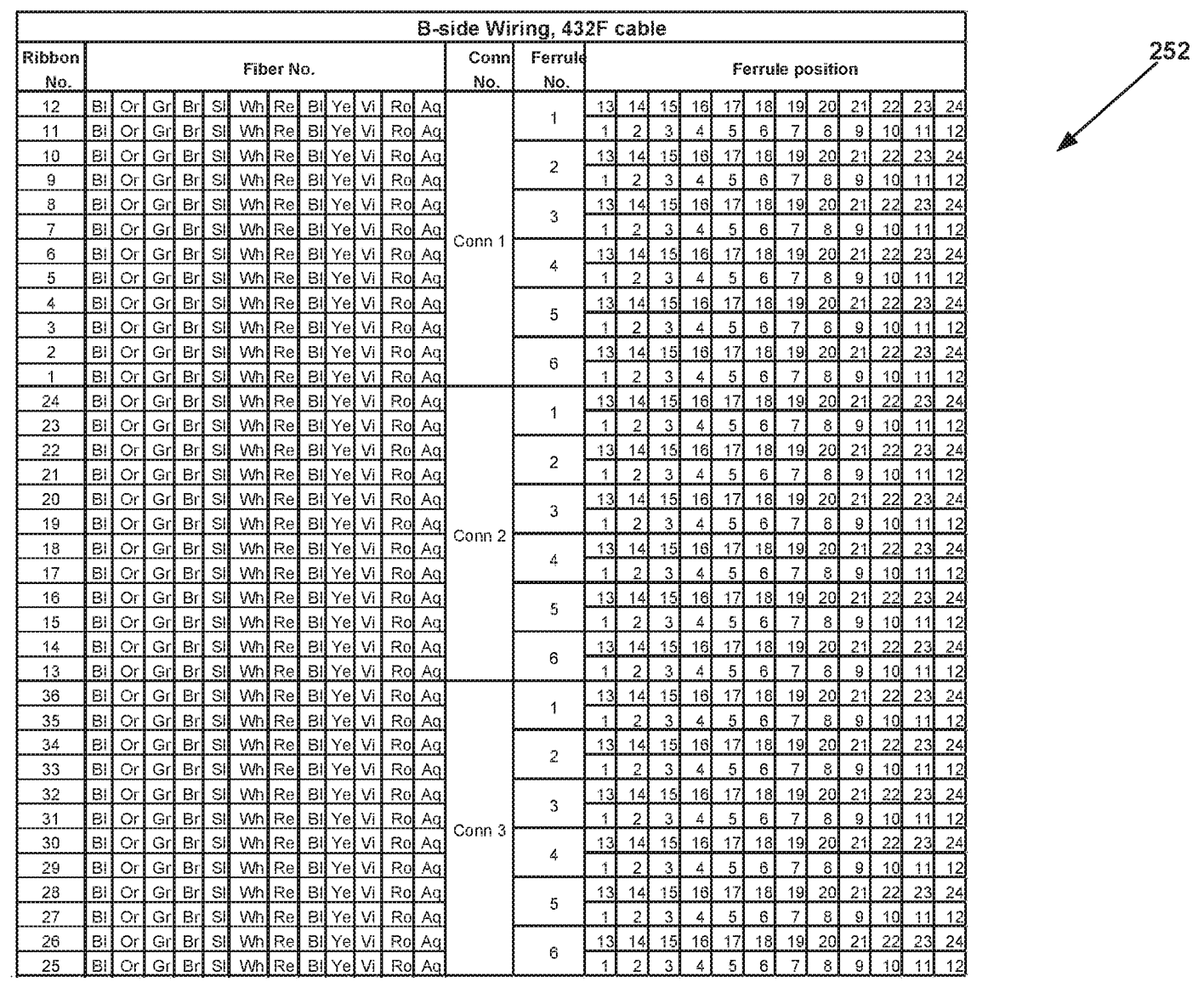

It will be appreciated that the fiber optic cables 120*a* and 120*b* can include 432 fibers arranged in thirty-six 12-fiber ribbons. The cables 120*a*, 120*b* can includes three 144-fiber connectors 223*a*, 223*b* positioned at opposite A and B ends of each of the cables 120*a*, 120*b*. FIG. 7 is a fiber layout 250 for end A of one of the fiber optic cables 120*a*, 120*b*. FIG. 8 is a fiber layout 252 for end B of one of the fiber optic cables 120*a*, 120*b*. As shown by FIGS. 7 and 8, ribbons 1-12 are routed between a first pair of the connectors 223*a*, 223*b* positioned at opposite ends of the cable. Also, ribbons 13-24 are routed between a second pair of the connectors 223*a*, 223*b* positioned at opposite ends of the cable. Further, ribbons 25-36 are routed between a third pair of the connectors 223*a*, 223*b* positioned at opposite ends of the cable.

Figure 9:
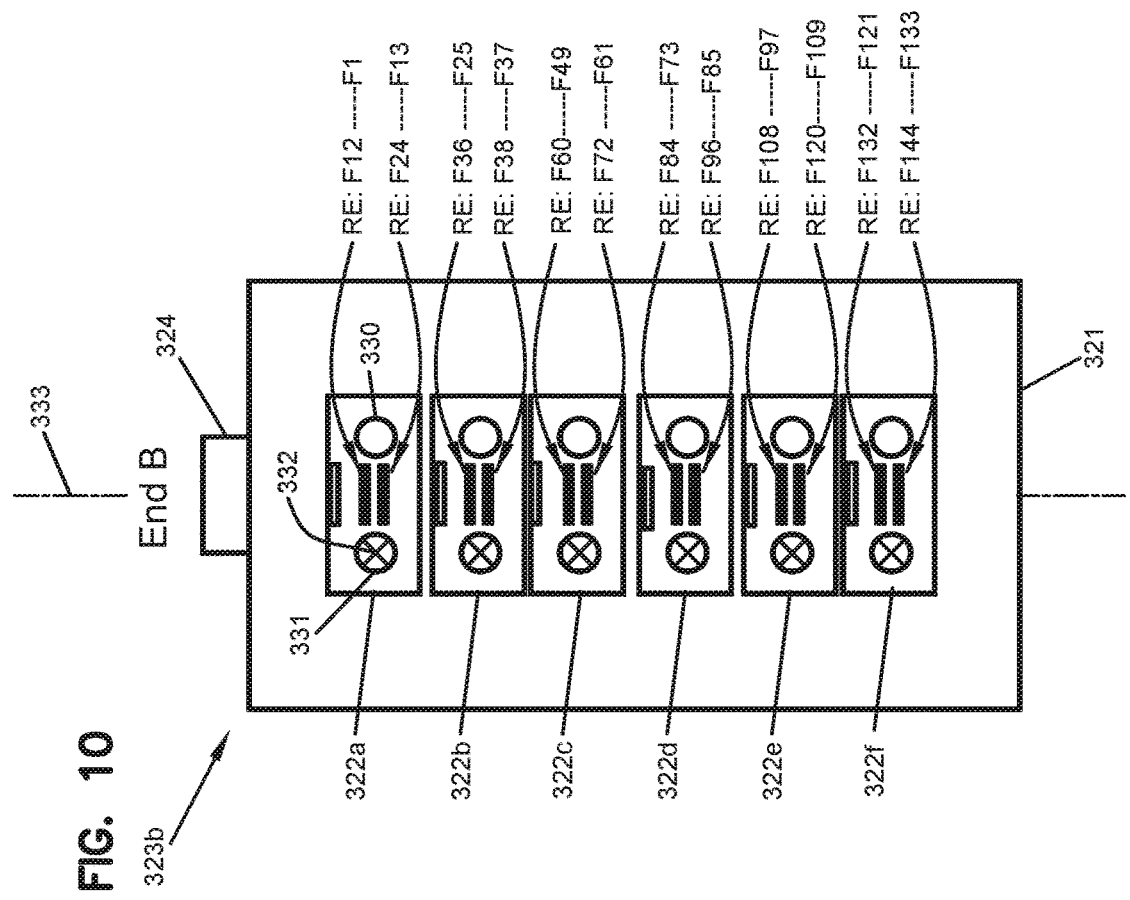
FIGS. 9 and 10 show alternative 144-fiber optical connectors for supporting the ends of optical fiber ribbons routed through cables in accordance with the architecture of FIG. 1.
Figure 10:
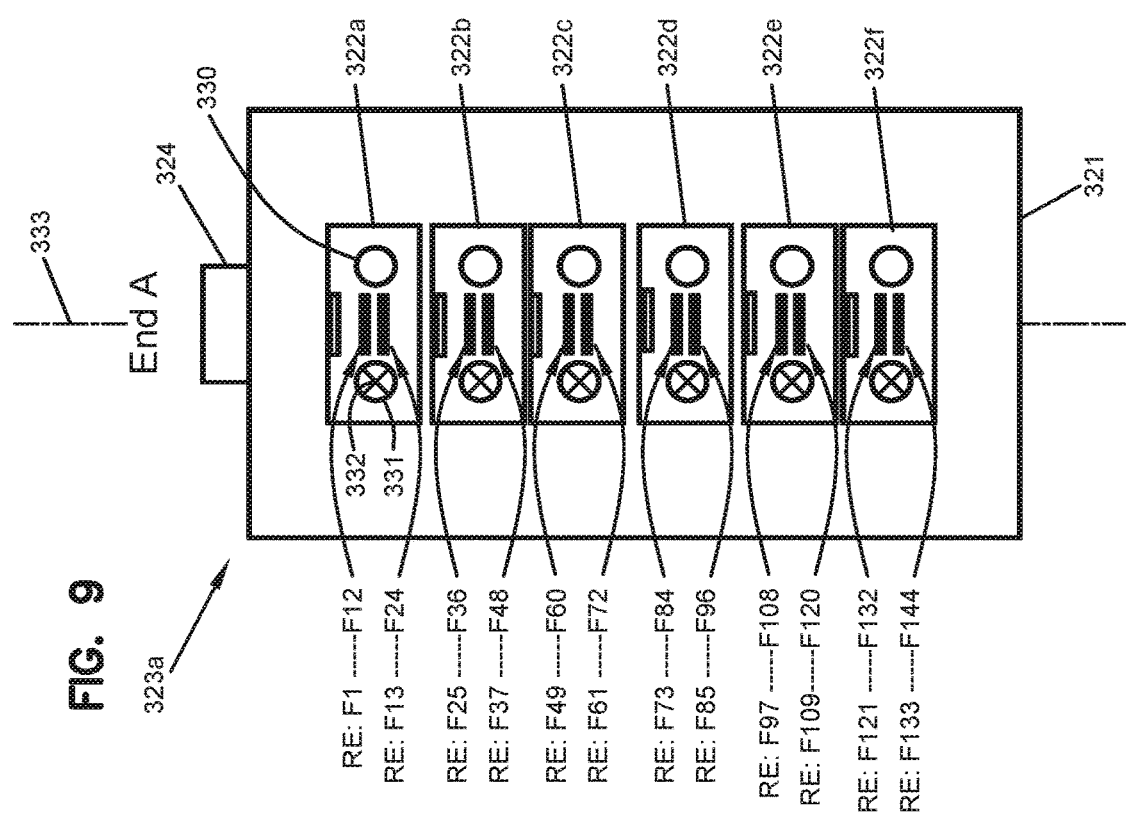

FIGS. 9 and 10 show the end faces of two alternative fiber optic connectors 323*a*, 323*b* that can be positioned at opposite A and B ends of a given one of one of the cables 120*a*-120*f* and that are optically connected to one another by optical fibers routed through the given one of the fiber optic cables 120*a*-120*f*. The connector 323*a* of FIG. 9 is mounted at an A end of a high fiber-count fiber optic cable and the connector 323*b* of FIG. 10 is mounted at a B end of the fiber optic cable. Optical fibers are routed through the fiber optic cable and supported at each A and B end of the fiber optic cable by the connectors 323a, 323b. It will be appreciated that the connectors 323a and 323b have identical mechanical interfaces (e.g., keying structures) and identical ferrule layouts. Additionally, the connectors 323a, 323b are intermateable with one another. In certain examples, mating of the connectors 323a, 323b is facilitated through the use of a fiber optic adapter having opposite ports with keying structures that are positioned on the same sides of the ports (e.g., the keying structures can be provided on the top sides of the ports, the bottom sides of the ports, the left sides of the ports, or the right sides of the ports). The keying structures of the adapter are configured to mate with the keying structures of the connectors 323a, 323b. In this way, when the connectors 323a, 323b are mated together, the keying structures of the connectors 323a, 323b are not flipped relative to one another.

Referring still to FIGS. 9 and 10, the connectors 323a, 323b include mechanical coupling interfaces including keying structures such as keys 324. The connectors 323a, 323b also include six ferrules 322a-322f arranged consecutively in a row. The ferrules 322a-322f are supported by connector bodies 321. Each of the ferrules can support the end portions of 24 optical fibers. The end portions of the optical fibers can be positioned in fiber openings defined by the ferrules. The fiber openings can be arranged in two parallel rows for each ferrule. The parallel rows can be positioned between two ferrule alignment structures. It will be appreciated that the alignment structures can include vacant pin openings 330 and occupied pin openings 331. Alignment pins 332 are be fixed within the occupied pin openings 331. A "vacant" pin opening is a pin opening that is not filled with a pin when the given ferrule is not mated with another ferrule. When two ferrules are mated together, free ends of the pins 332 are received within the vacant pin openings 330.

In the example of FIGS. 9 and 10, the connectors 323a, 323b can be bisected by a reference plane 333 that also bisects each of the ferrules 322a-322f as well as the keying structure. The vacant pin openings 330 and the occupied pin openings 331 are arranged such that all of the pins 332 are located on one side of the reference plane 333 while all of the vacant pin openings 330 are positioned on an opposite side of the reference plane 333. Each of the ferrules 322a-322f has one vacant pin opening 330 and one occupied pin opening 331.

Referring to FIGS. 9 and 10, twelve fiber ribbons R1-R12 are routed through the fiber optic cable between the connectors 323a, 323b. The ribbons can be routed using a layout strategy consistent with polarity type B. In this type of arrangement, each of the ribbons R1-R12 is routed to the same ferrule and the same fiber row for each of the connectors 323a, 323b. However, the order of fibers at each row is reversed between the two connectors 323a, 323b. For example, fibers F1-F12 of the ribbon R1 respectively occupy positions 1-12 of the top fiber row of the ferrule 322a and fibers F1-F12 of the ribbon R1 respectively occupy positions 12-1 of the top fiber row of the ferrule 322a of the connector 323b. Similarly, the ribbon R12 has fibers F133-F144 supported respectively at positions 1-12 of the bottom row of ferrule 222f of the connector 323a and supported respectively at positions 12-1 of the bottom row of the ferrule 222f of the connector 323b. As shown at FIGS. 9 and 10, ribbons R2-R11 are routed in a similar manner.

Figure 11:
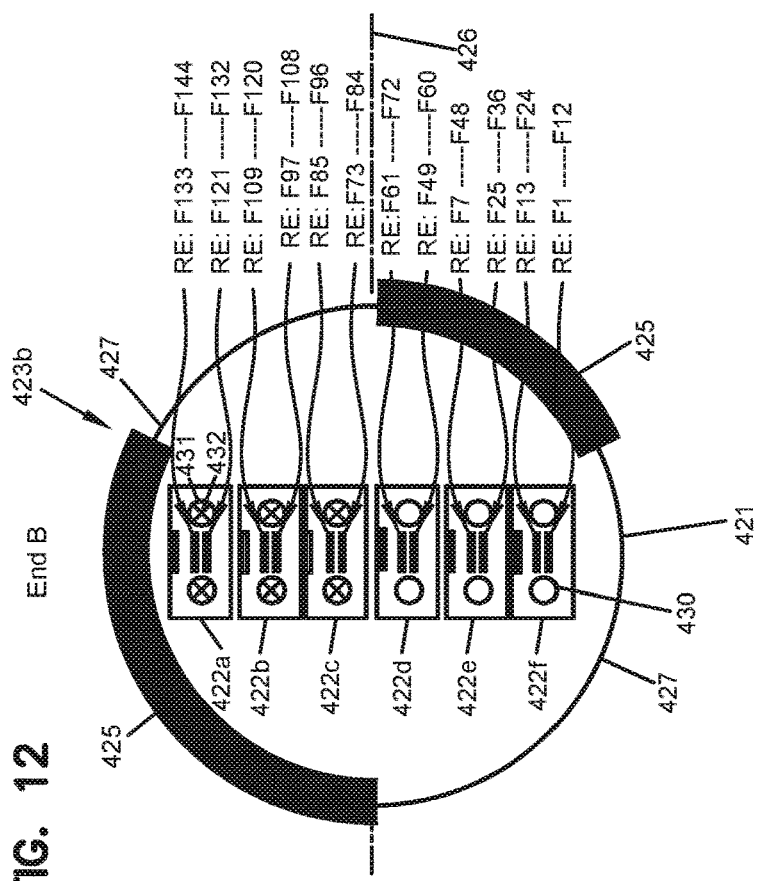
FIGS. 11 and 12 show further 144-fiber optical connectors suitable for supporting the ends of ribbon fibers routed through the fiber optic cables of the architecture of FIG. 1.
Figure 12:
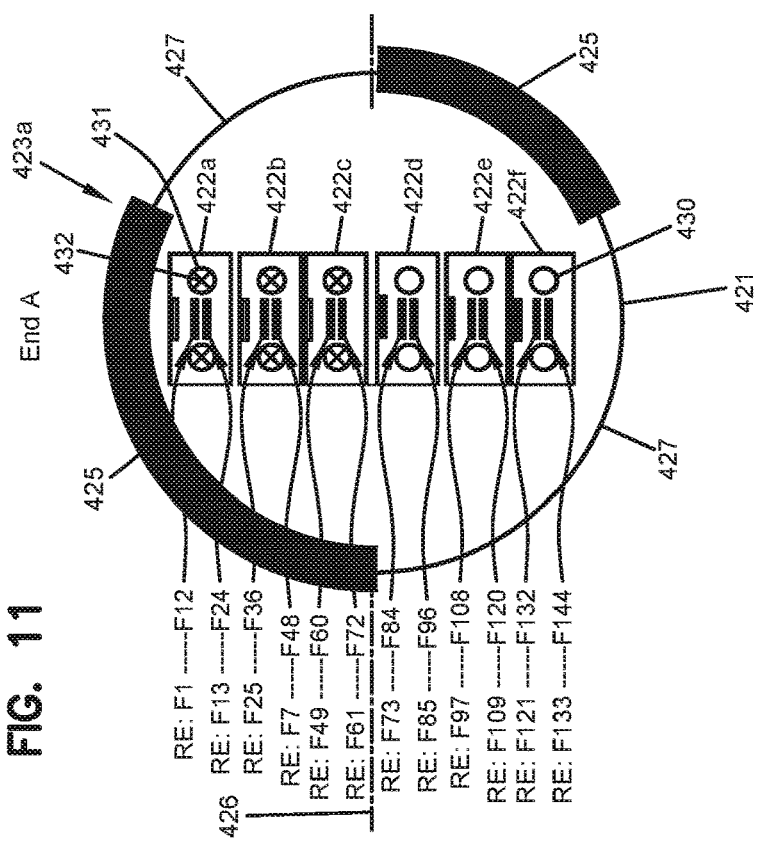

FIGS. 11 and 12 show the end faces of two alternative fiber optic connectors 423a, 423b that can be positioned at opposite A and B ends of a given one of one of the cables 120a-120f and that are optically connected to one another by optical fibers routed through the given one of the fiber optic cables 120a-120f. The connector 423a of FIG. 11 is mounted at an A end of a high fiber-count fiber optic cable and the connector 423b of FIG. 12 is mounted at a B end of the fiber optic cable. In certain examples, the connectors 423a, 423b can have mechanical interfaces that are identical with one another and that are intermateable with one another. As depicted, the mechanical interfaces can include projections 425 and receptacles 427. When two of the connectors 423a, 423b are mated, the projections 425 are received within the receptacles 427 to provide a mated connection and a predetermined rotational orientation between the connectors. The connectors 423a, 423b include six ferrules 422a-422f arranged consecutively in a row with each ferrule positioned at a specified location and orientation relative to the mechanical interface. The ferrules 422a-422f are supported by connector bodies 421. A reference plane 426 divides the ferrules 422a-422f into a first group including ferrules 422a-422c and a second group including ferrules 422d-422f. Each of the ferrules is depicted as a 24-fiber ferrule supporting two rows of optical fibers each including 12 optical fibers. The ferrules 422d-422f have vacant pin openings 430 positioned on opposite sides of the fiber rows. The ferrules 422a-422c have occupied pin openings 431 positioned on opposite sides of the rows of fibers. Pins 432 are fixed within the occupied pin openings 431.

It will be appreciated that twelve ribbons each having twelve fibers are routed between the connectors 423a, 423b. The ribbons R1-R12 can be routed according to the same routing plan or scheme as described with respect to the connectors 223a, 223b. The projections and receptacles 425, 427 are configured such that when two connectors are mated, the groups of ferrules 422a-422c and 422d-422f are flipped 180 degrees relative to one another (i.e., rotated, transposed, inverted) thereby allowing the pins 432 and vacant pin openings 430 of the connectors to mate with one another and provide alignment between the optical fibers supported by the mated ferrules. The connectors 423a, 423b can be coupled together without the use of an intermediate fiber optic adapter. Coupling sleeves, nuts, latches or other fasteners can be used to secure the connectors 423a, 423b together.

Figure 13:
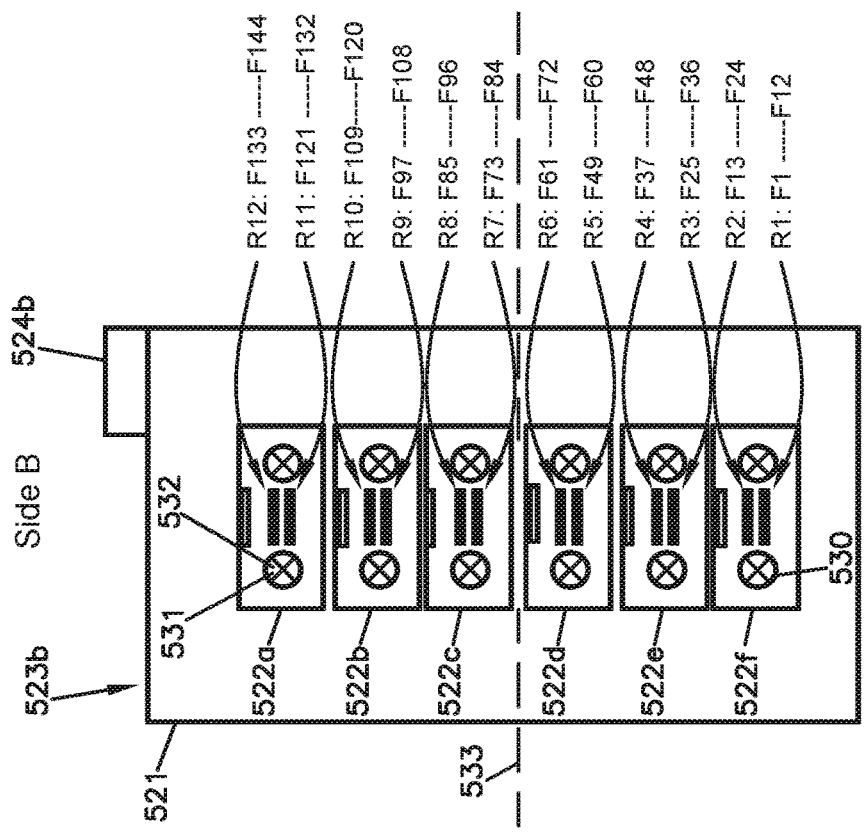
FIGS. 13 and 14 show still further 144-fiber optical connectors suitable for supporting the ends of optical fiber ribbons routed through fiber optic cables in accordance with the architecture of FIG. 1.
Figure 14:
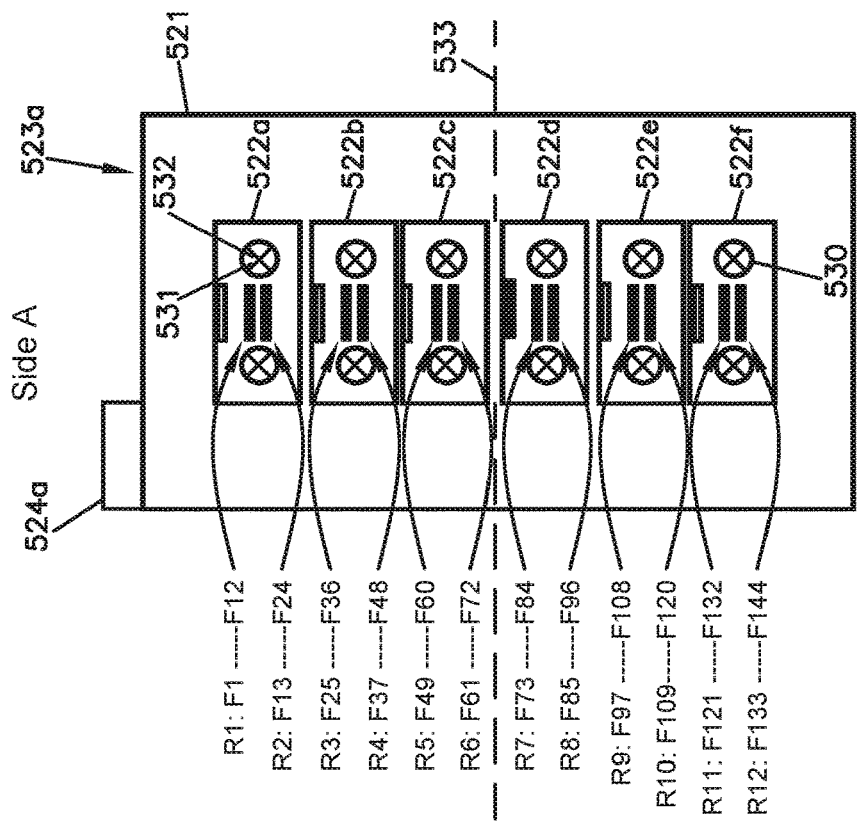

FIGS. 13 and 14 show the end faces of two further fiber optic connectors 523a, 523b that can be positioned at opposite A and B ends of a given one of one of the cables 120a-120f and that are optically connected to one another by optical fibers routed through the given one of the fiber optic cables 120a-120f. The connector 523a of FIG. 13 is mounted at an A end of a high fiber-count fiber optic cable and the connector 523b of FIG. 14 is mounted at a B end of the fiber optic cable. In certain examples, the connectors 523a, 523b can be 144 fiber connectors having the same ferrule configuration and fiber routing layout as the connectors 223a, 223b. However, the connectors 523a, 523b have different mechanical coupling interfaces from one another. For example, the connectors 523a, 523b can have keys 524a, 524b positioned at different rotational positions on the connector body 521. The coupling interfaces can be configured to prevent two of the same connectors from being coupled to one another (e.g., the "A" ends of two cables are prevented from being coupled together and the "B" ends of two cables are prevented from being coupled together). In certain examples, the connectors 523a, 523b are coupled together by the use of an intermediate fiber optic adapter having a first port that only receives a connector with a mechanical interface type depicted by the connector 523a and a second port configured to only receive a connector with a mechanical interface of the type shown by the connector 523b. With this type of configuration, the installation process must be pre-planned such that adjacent ends of the cables are compatible and connectable to one another. In other words, the end of one cable must have a connector of the type depicted by the connector 523a and the mating cable end must have a connector of the type depicted by the connector 523b. This type of configuration is preferred for systems where it is desired to have the ability to provide mid-span access locations along the length of a given cable.

With regard to the connectors 523a, 523b of FIGS. 13 and 14, the connectors can each have a row of consecutively positioned ferrules 522a-522f of the type described previously with respect to the connectors 223a, 223b. The ferrules can be supported on a connector body 521. A reference plane 533 can separate the ferrules into two groups. The ferrules 522d-522f on one side of a reference plane 533 can have vacant pin openings 530 while the ferrules 522a-522c on an opposite side of the reference plane 533 can occupied pin openings 531 in which alignment pins 532 are fixed. Fiber routing within a cable that extends between the connectors 523a, 523b can have a layout of the type described with respect to the connectors 223a, 223b. When the connectors 523a, 523b are mated within a corresponding fiber optic adapter of the type described above, the rows of ferrules 522a-522f are flipped 180 degrees relative to one another to allow the pins 532 of the mated connectors 523a, 523b to mate with the vacant pin openings 530 of the mated connectors 523a, 523b.

In the system of FIG. 1, mated 144 fiber connectors of the type described above can be used to provide the connectorized pass-through connections 123. Additionally, 144 fiber connectors of the type described above can be used at the ends of the non-furcated patch cords 129. In this way, the patch cords 129 can couple to connectors at the ends of the corresponding trunk cables and can also couple to like connectors provided at the FDH's or other branch locations. The upstream connectors 127a of the furcated patch cords 127 can include 144 fiber connectors of the type described above. The downstream connectors 127b of the furcated patch cord 127 can include 72 fiber connectors configured to be mateable with 144 fiber connectors of the type described above. The FDH locations can include 72 or 144 fiber connectors.

Figure 15:
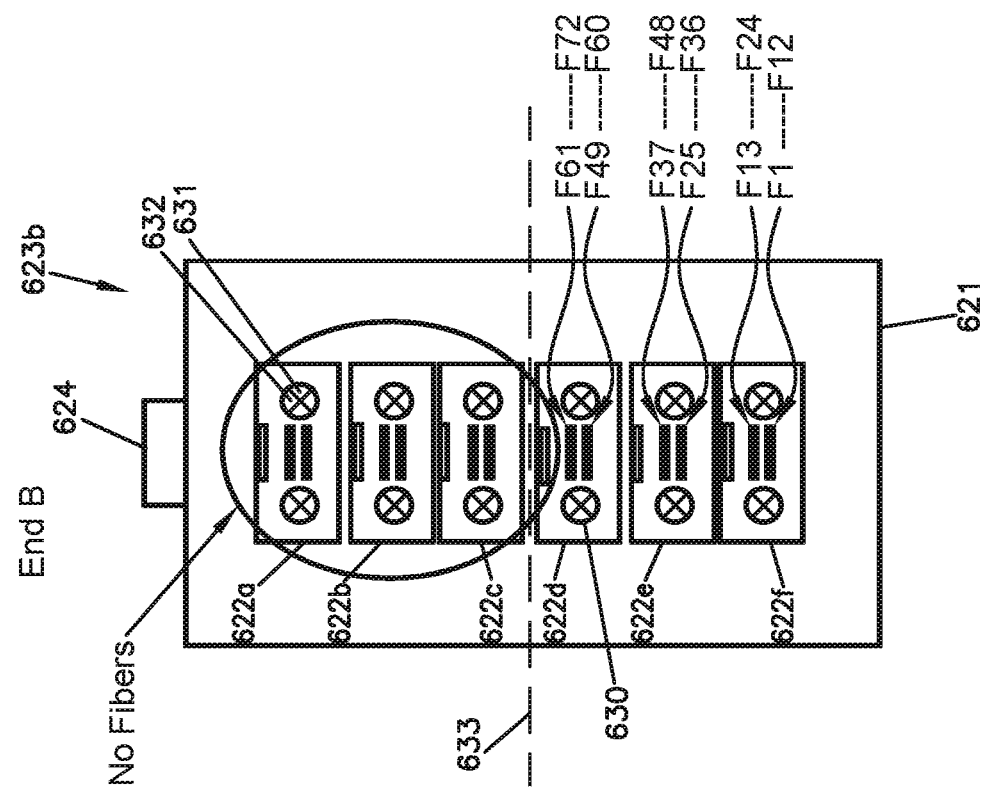
FIGS. 15 and 16 show example 72-fiber optical connectors that can be utilized in the architecture of FIG. 1.
Figure 16:
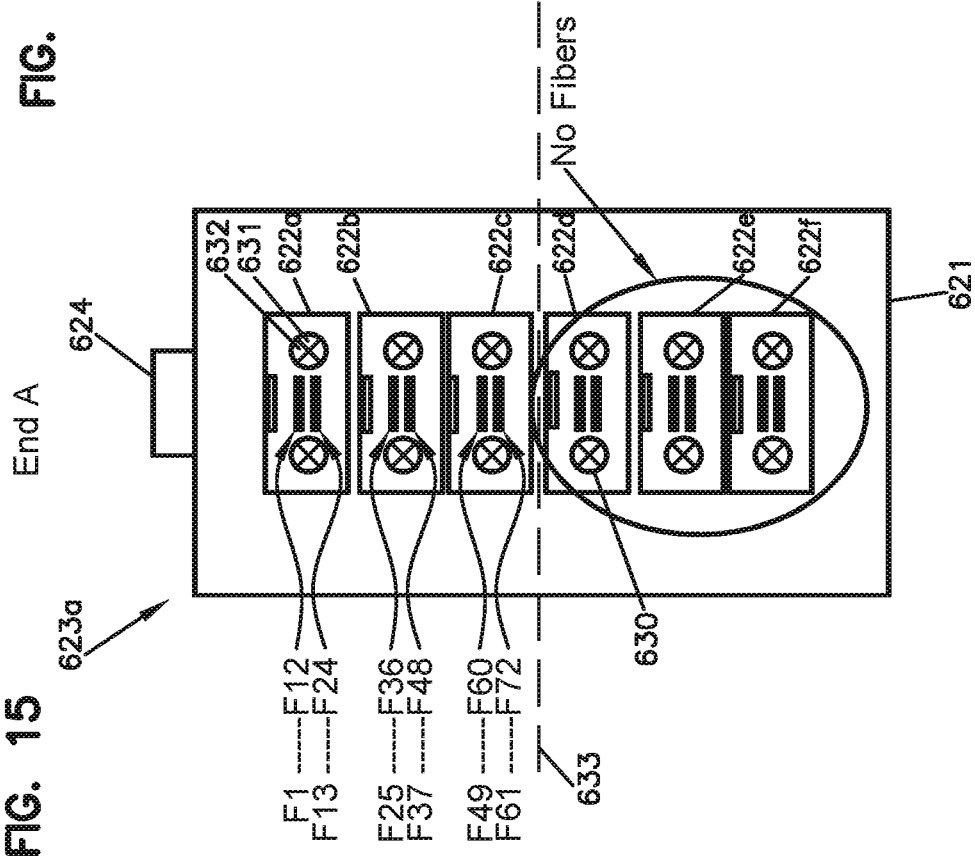

FIGS. 15 and 16 show end faces of 72-fiber optic connectors 623a, 623b that are suitable for use as certain fiber optic connectors of the system of FIG. 1. The 72-fiber optical connectors 623a, 623b are mateable with each other and are also mateable/compatible with 144-fiber connectors such as the connectors 223a, 223b. In certain examples, the connectors 623a, or 623b can be used as the downstream connectors 127b of the furcated patch cords 127 and can also be provided at the FDH locations. The fiber optic connectors 623a, 623b each include a mechanical mating interface that includes an alignment key 624. The fiber optic connectors 623a, 623b each include a row of consecutive ferrules 622a-622f supported on a connector body 621. The ferrules 622a-622c are positioned on one side of a reference plane 633 while the ferrules 622d-622f are positioned on an opposite side of the reference place 633. The ferrules 622d-622f have vacant pin openings 630 while the ferrules 622a-622c have alignment pins 632 fixed within occupied pin openings 631. For the fiber optic connector 623a, the ends of seventy two fibers are supported by the ferrules 622a-622c. Each of the ferrules supports twenty-four fibers in two separate rows of twenty-four fibers. The ferrules 622d-622f of the connector 623a are vacant and do not support any optical fibers. The fiber optic connector 623b has an opposite fiber configuration as compared to the connector 623a. For example, with regard to the fiber optic connector 623b, the ferrules 622d-622f are twenty-four fiber ferrules that cooperate to support 72 optical fibers. The optical fibers are supported in two rows of twelve fibers provided at each of the ferrules 622d-622f. The ferrules 622a-622c of the connector 623b are vacant and do not support any optical fibers.

It will be appreciated that either of the connectors 623a, 623b can be mated with the connectors 223a, 223b so as to provide a 72-fiber connection between the intermated connectors. It will be appreciated that an intermediate fiber optic adapter can be used to mechanically couple and align the mated connectors.

With regard to the connectors 623a, 623b, it will be appreciated that two connectors having the configuration of 623a cannot be mated together and two connectors having the configuration of 623b cannot be mated together. Instead, it is intended for connectors having the configuration of 623a to be mated with connectors having the configuration of connector 623b. Fiber optic adapters can be used to align and mechanically couple two of the fiber optic connectors 623a, 623b.

Figure 17:
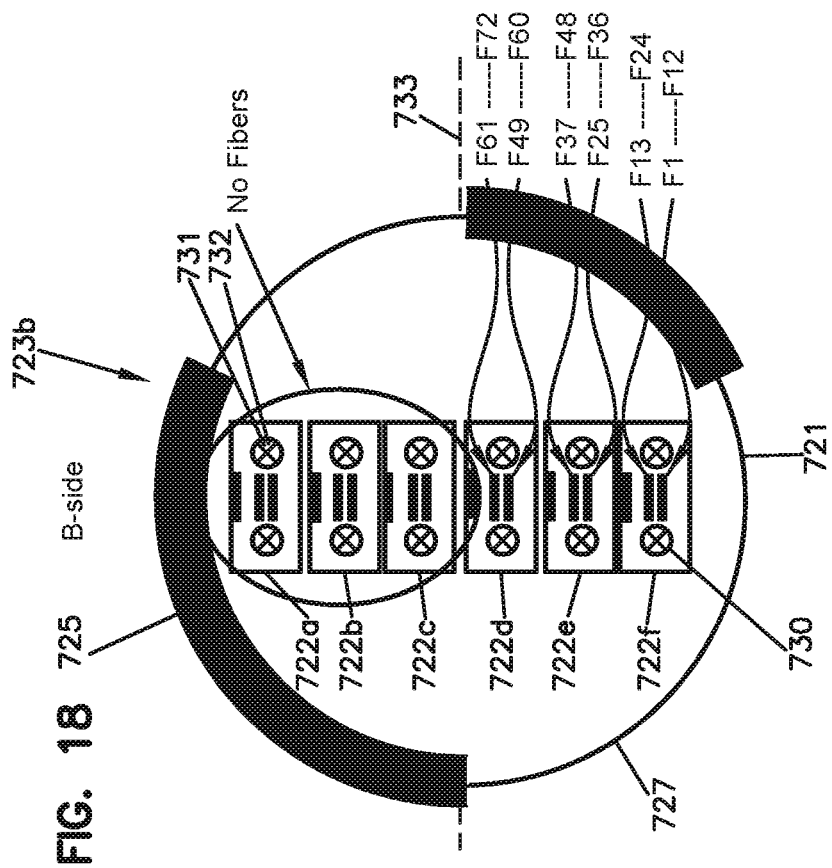
FIGS. 17 and 18 show still further fiber optic connectors that can be incorporated into the architecture of FIG. 1.
Figure 18:
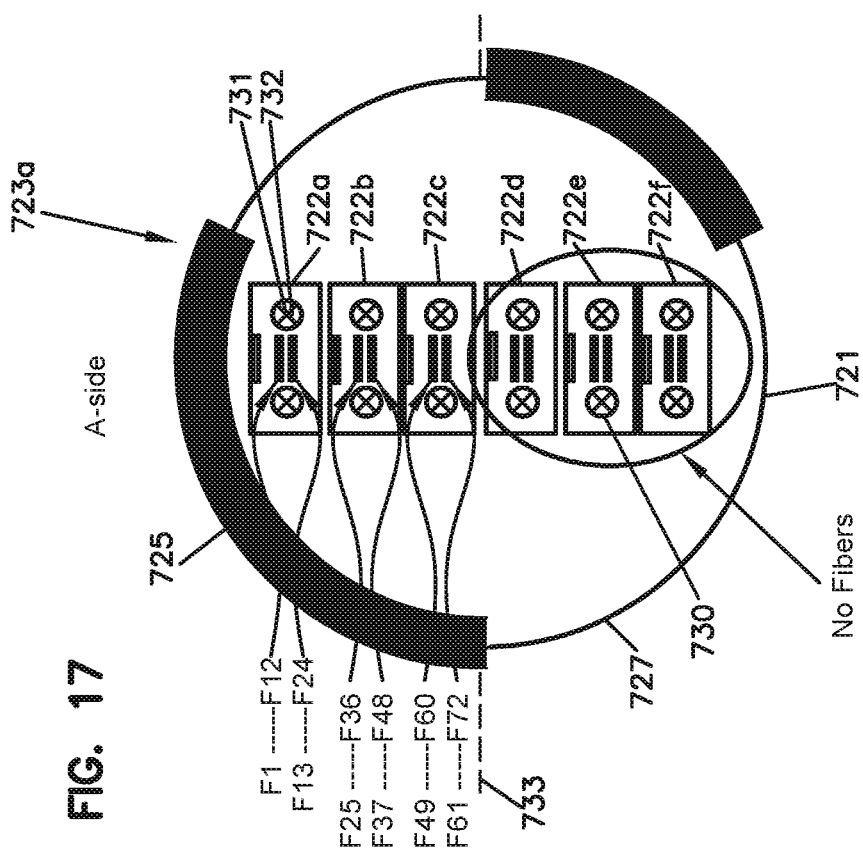

FIGS. 17 and 18 show 72-fiber optical connectors 723a, 723b that are mateable with each other and are also mateable/compatible with 144-fiber connectors such as the connectors 423a, 423b. In certain examples, the connectors 723a, or 723b can be used as the downstream connectors 127b of the furcated patch cords 127 and can also be provided at the FDH locations. Each of the connectors 723a, 723b includes mechanical alignment structures (keying structures) such as projections 725 and receptacles 727 that are configured to mate when two of the connectors 723a, 723b are coupled together. The projections 725 and receptacles 727 require the connectors 723a, 723b to be at a particular rotational orientation relative to one another when coupled together. Similar to the connectors previously described herein, the fiber optic connectors 723a, 723b include a row of consecutively positioned ferrules 722a-722f supported by a connector body 721. The ferrules 722a-722c are positioned on one side of a bisecting reference plane 733 while the ferrules 722d-722f are positioned on an opposite side of the bisecting reference plane 733. The ferrules 722d-722f are provided with occupied pin openings 731 in which pins 732 are fixed and the ferrules 722a-722c are provided with vacant pin openings 730. With regard to the connectors 723a, the ferrules 722a-722c are twenty-four fiber ferrules that cooperate to support the ends of seventy-two optical fibers. In contrast, the ferrules 722d-722f are blank and do not support any optical fibers. The connector 723b has an opposite fiber arrangement as compared to the connector 723a. For example, in the connector 723b, the ferrules 722d-722f are twenty-four fiber ferrules that cooperate to support the ends of seventy-two optical fibers, and the ferrules 722a-722c are blank.

It will be appreciated that due to the arrangements of the fibers, two of the connectors 723a are not intended to be mated together, and two of the connectors 723b are not intended to be mated together. Instead, due to the flipped arrangement of the optical fibers, when mating two 72-fiber connectors, it is desirable to couple a connector having the configuration of 723a with a connector having the configuration of 723b. In this way, ferrules supporting fibers are mated with one another and ferrules that are blank are mated with one another.

Figure 19:
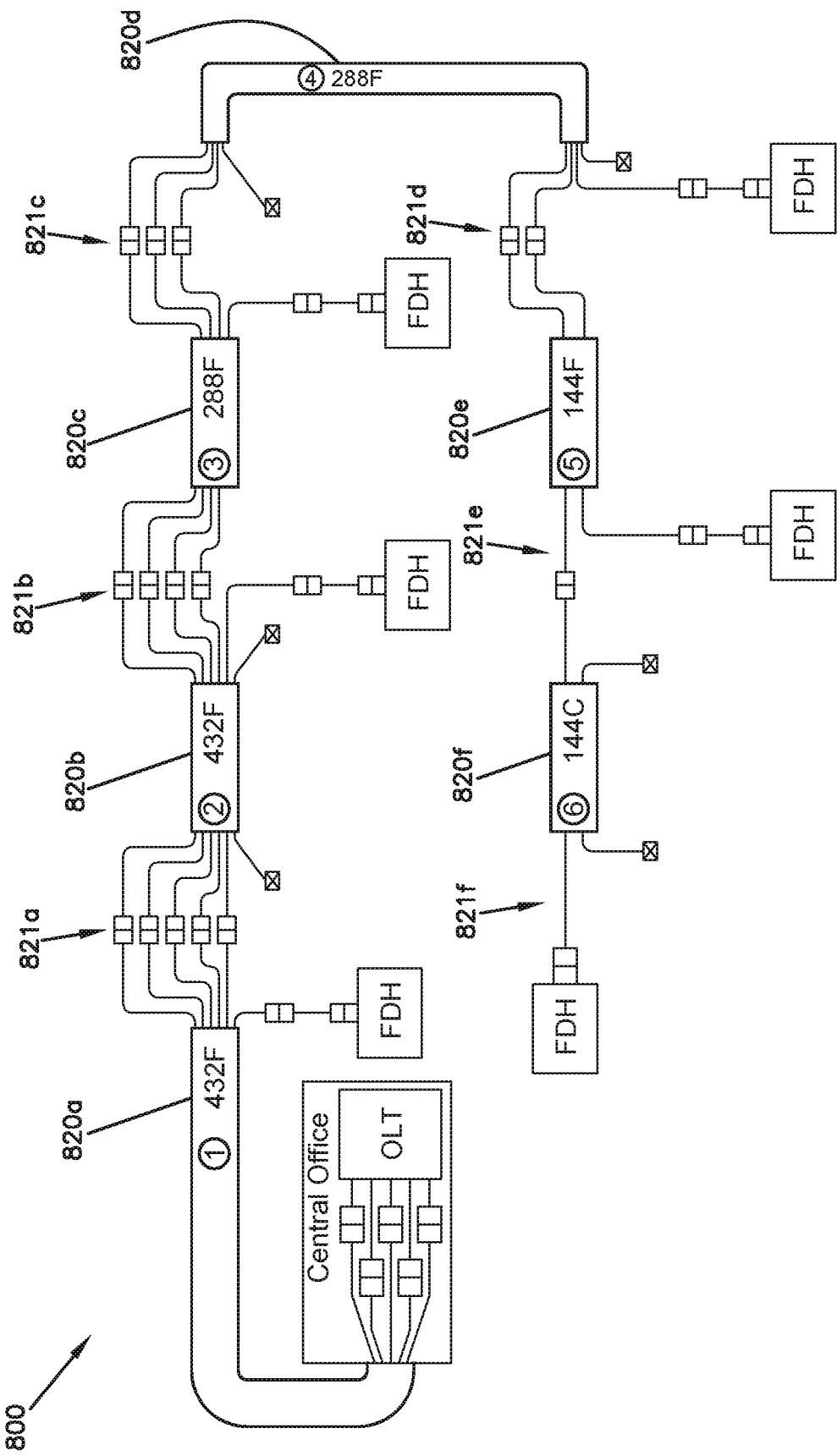
FIG. 19 shows an alternative architecture in accordance with the principles of the present disclosure that utilizes 72-fiber optical connectors.

FIG. 19 shows another optical network 800 in accordance with the principles of the present disclosure. Similar to the previously described network, optical network 800 can be used to distribute fiber optic service from a centralized location to a plurality of subscriber locations. The optical network 800 includes six fiber optic cables 820a-820f that are optically connected in an end-to-end configuration. The fiber optic cables 820a-820f are interconnected at coupling locations 821a-821e. In the depicted example, the cable 820a has 432 fibers, the cable 820b has 432 fibers, the cable 820c has 288 fibers, the cable 820d has 288 fibers, the cable 820e has 144 fibers, and the cable 820f has 144 fibers. The various optical connections made in the optical network 800 can be made with connectorized optical couplings using mated fiber optic connectors such as 72-fiber optical connectors. The 72-fiber optical connectors are used to optically connect the fiber optic cables 820a-820f end-to-end via connectorized pass-through connections 823. The 72-fiber optical connectors are also used to optically connect selected optical fibers of the fiber optic cables 820a-820f to branch locations. The 72-fiber connectors can be provided at the ends of connectorized patch cords 829 which provide connectorized optical couplings with the ends of the cables 820a-820f at the coupling locations 821a-821f and with branch locations such as FDH's 830a-830f. In the depicted embodiment of FIG. 19, 72 fibers are branched out from the main trunk line at each of the coupling locations 821a-821e.

In the optical network 800 of FIG. 19, a pattern is utilized where pairs of fiber optic cables having the same number of optical fibers are connected together followed by subsequent pairs of fiber optic cables having reduced numbers of optical fibers. It will be appreciated that the first fiber optic cable in the pair typically has all live fibers while the second optical fiber in each pair has a plurality of dark fibers. The number of optical fibers in the optical pairs are incrementally stepped down as the main cable trunk extends in a downstream direction. In one example, the second pair of cables each have 144 fibers fewer than the first pair of fiber optic cables. Similarly, the third pair of fiber optic cables have 144 fibers fewer than the second pair of fiber optic cables. In certain examples, 72 fibers are branched out from the main trunk defined by the fiber optic cables 820a-820f at each of the coupling locations 821a-821f. In the depicted example, each cable that is the second in a pair of cables has 72 dark fibers. It will be appreciated that the use of 72-fiber optical connectors greatly simplifies the network by reducing the number of different types of components that are used. It will be appreciated that in certain examples, the 72-fiber connectors 623a, 623b or 723a, 723b can be used to provide various connectorized optical connections of the optical network 800. In FIGS. 15-18, notations are provided that layout example fiber positioning within the connectors suitable for using the connectors 623a, 623b or 723a, 723b at opposite A and B ends of an optical ribbon cable. Each connectorized coupling location includes mating fiber optic connectors.

FIGS. 20 and 21 show other 72-fiber connectors 923a, 923b suitable for use in the optical network 800 of FIG. 19. The fiber optic connectors 923a, 923b have the same configuration as the fiber optic connectors 223a, 223b except ferrules 922a-922f support only 12 optical fibers as compared to 24 optical fibers. In a given optical cable containing a plurality of fiber ribbons, the fiber optic connectors 923a, 923b can be mounted to the ribbons at opposite ends of the cable (e.g., at the "A" end and the "B" end). It will be appreciated that the fiber optic connectors 923a, 923b have the same configuration and can be mated with one another. Thus, the cables can connect "A" end to "A" end; "B" end to "B" end; or "A" end to "B" end without issue. It will be appreciated that the fiber ribbons within the cable can be routed in a polarity type A configuration between the ferrules 922a-922f of the fiber optic connectors 923a, 923b.

Figure 22:
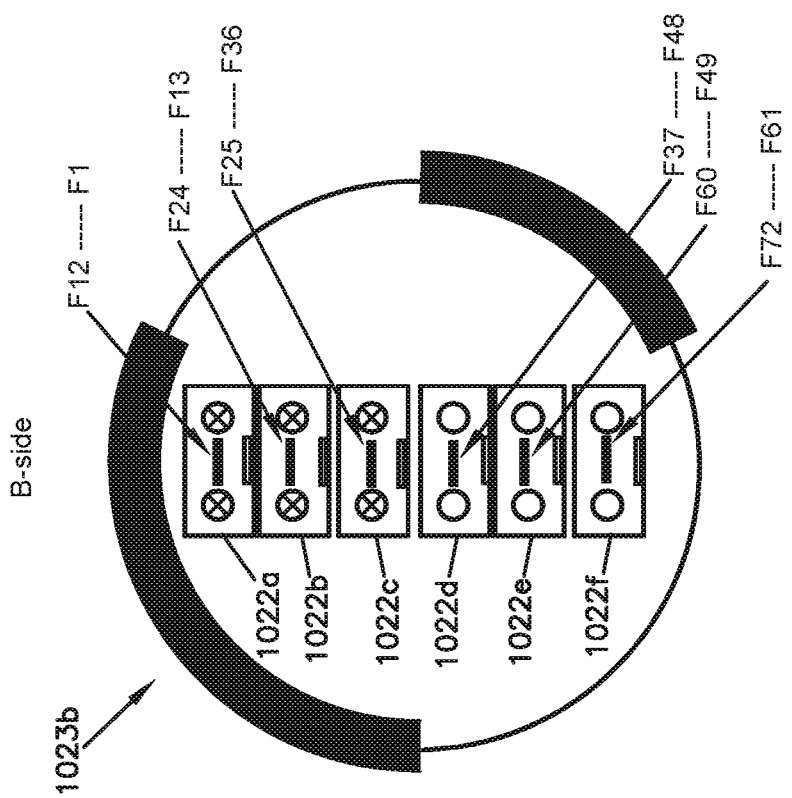
FIGS. 22 and 23 show additional 72-fiber optical connectors that can be mounted at opposite ends of fiber ribbons routed through fiber optic cables of the architecture of FIG. 19.
Figure 23:
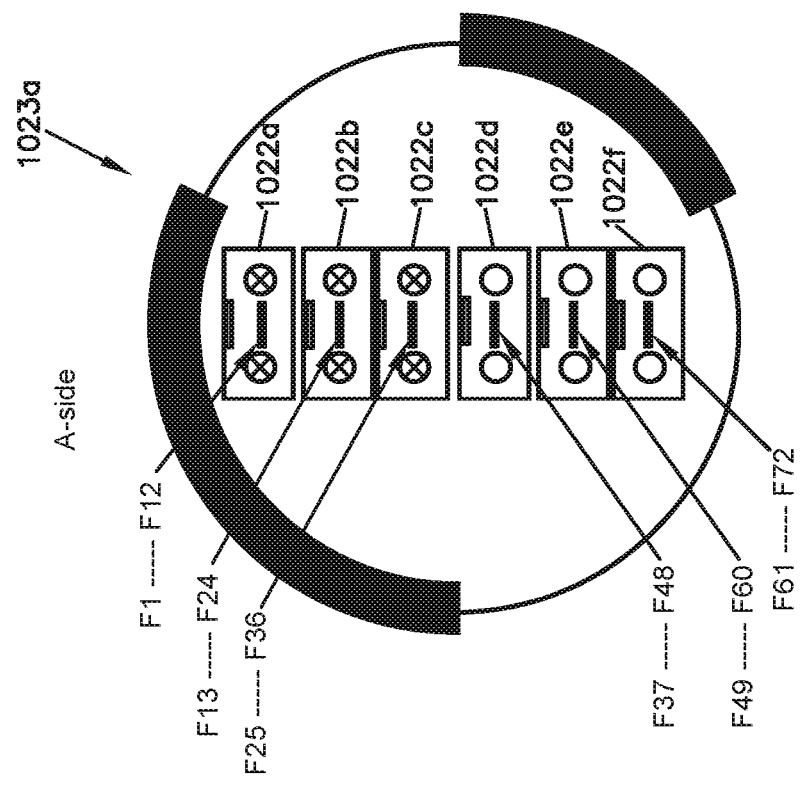

FIGS. 22 and 23 show further 72-fiber optical connectors 1023a, 1023b that can be used in the optical network 800 of FIG. 19. The connectors 1023a, 1023b have the same configuration as the connectors 423a, 423b except ferrules 1022a-1022f each support only 12 fibers as compared to 24 fibers. It will be appreciated that the connectors 1023a, 1023b have identical configurations and are mateable with one another. In a given optical cable containing a plurality of fiber ribbons, the fiber optic connectors 1023a, 1023b can be mounted to the ribbons at opposite ends of the cable (e.g., at the "A" end and the "B" end). The use of the connectors 1023a, 1023b allows the cables to be connected "A" end to "A" end; "B" end to "B" end; or "A" end to "B" end. It will be appreciated that the fiber ribbons within the cable can be routed in a polarity type A configuration between the ferrules 1022a-1022f of the fiber optic connectors 1023a, 1023b.

Figure 24:
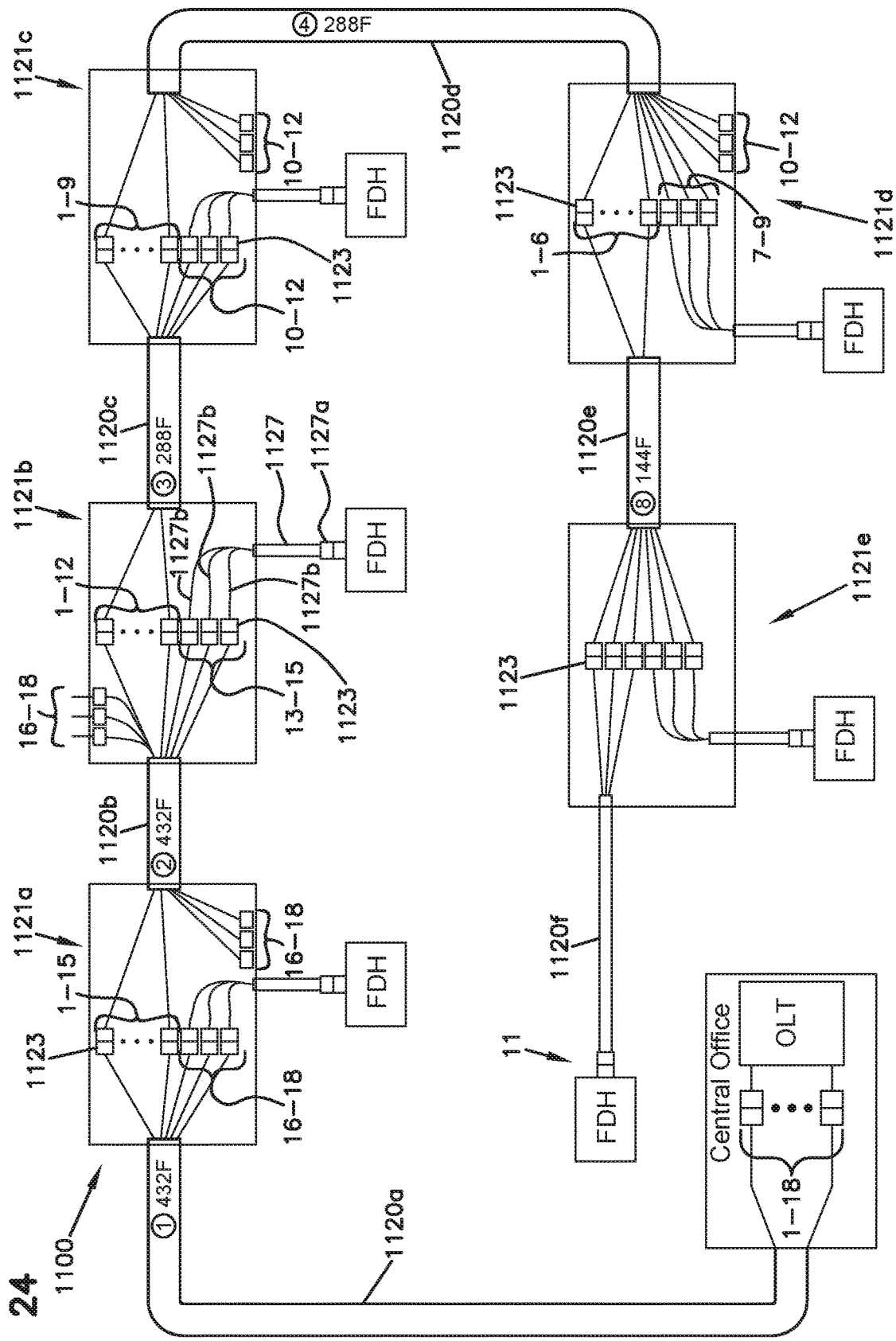
FIG. 24 schematically depicts still a further fiber optic architecture in accordance with the principles of the present disclosure.

FIG. 24 shows a further optical network 1100 in accordance with the principles of the present disclosure. The network 1100 includes 6 optical cables 1120a-1120f connected end to end. Similar to the previously described optical networks, the fiber optic cables can be arranged in pairs having the same number of optical fibers. As the trunk extends in a downstream direction, the number of fibers present in the cable pairs incrementally decreases. In certain examples, the number of optical fibers in subsequent cable pairs decreases by increments of 144 fibers.

In the embodiment of FIG. 24, optical connections are made between the fiber optic cables 1120a-1120f by 24-fiber optical connectors 1123. Each 24-fiber connector can include a ferrule supporting two parallel rows of twelve optical fibers. The 24-fiber optical connectors provide connectorized optical connections between adjacent fiber optic cables in the trunk. The 24-fiber fiber optic connectors 1123 also provide connections between optical fibers of the cables 1120a-1120f and branch lines that extend to distribution components such as fiber distribution hubs or other enclosures. In the depicted example, 72 fibers are dropped at each of the interconnection locations between each of the cable ends.

Similar to the previously described networks, optical network 1100 can be used to distribute fiber optic service from a centralized location to a plurality of subscriber locations. The optical network 1100 includes six fiber optic cables 1120a-1120f that are optically connected in an end-to-end configuration. The fiber optic cables 1120a-1120f are interconnected at coupling locations 1121a-1121e. In the depicted example, the cable 1120a has 432 fibers, the cable 1120b has 432 fibers, the cable 1120c has 288 fibers, the cable 1120d has 288 fibers, the cable 1120e has 144 fibers, and the cable 1120f has 144 fibers. The various optical connections made in the optical network 1100 can be made with connectorized optical couplings using mated fiber optic connectors such as 24-fiber optical connectors. The 24-fiber optical connectors are used to optically connect the fiber optic cables 1120a-1120f end-to-end via connectorized pass-through connections. The at least some 24-fiber optical connectors are also used optically connect selected optical fibers of the fiber optic cables 1120a-1120f to branch locations. In certain examples, the branch connections can be provided through the use of furcation cable assemblies 1127 (e.g., fan-out cable assemblies, break-out cable assemblies). In certain examples, the furcation cable assemblies can include a combined end 1127a having a single multi-fiber connector (e.g., a 72-fiber connector) and an opposite broken-out end having a plurality of legs 1127b (e.g., 3 legs) each connectorized with a multi-fiber connector (e.g., a 24-fiber connector). All of the optical fibers of furcation cable assembly are present at the combined end 1127a and the optical fibers can be separated at a transition and divided between the legs 1127b. In one example, the optical fibers are separated so as to be divided evenly between the legs 1127b. In one example, the multi-fiber connector at the combined end 1127a supports more optical fibers then the multi-fiber connectors at the legs 1127b. In one example, the multi-fiber connector at the combined end 1127a supports a multiple of the number of fibers supported at the connector of each leg 1127b. In one example, the multiple is equal to the number of legs 1127b (e.g., 3 times in the depicted embodiment). The furcation cable assembly can be installed with the legs 1127b upstream and the combined end 1127a downstream. For example, the legs 1127b can be coupled to end connectors of the cables 1120a-1120f at the coupling locations 1121a-1121f and the combined end 1127a can be coupled to a mating connector at an FDH.

From the forgoing detailed description, it will be evident that modifications and variations can be made without departing from the spirit and scope of the disclosure.

What is claimed is:

1. A fiber optic connector comprising:
    a connector body defining a mechanical interface and supporting a ferrule arrangement, the ferrule arrangement including:
        six multi-fiber ferrules arranged consecutively in a row, the six multi-fiber ferrules including first and second sets of three multi-fiber ferrules separated by a reference plane, the multi-fiber ferrules of the first set each including two alignment pins and the multi-fiber ferrules of the second set each including two vacant pin openings,
    wherein the fiber optic connector is configured to optically couple to another fiber optic connector having an identically configured ferrule arrangement and an identically configured mechanical interface.

2. The fiber optic connector of claim 1, wherein the multi-fiber ferrules of the first set and the second set each support 24 optical fibers.

3. The fiber optic connector of claim 1, wherein the multi-fiber ferrules of the first set and the second set each support 12 optical fibers.

4. The fiber optic connector of claim 1, wherein the ferrule arrangement is configured to optically couple to the ferrule arrangement of the another fiber optic connector using an intermediate fiber optic adapter.

5. The fiber optic connector of claim 1, wherein the ferrule arrangement is configured to optically couple to the ferrule arrangement of the another fiber optic connector without the use of an intermediate fiber optic adapter.

6. The fiber optic connector of claim 1, wherein the mechanical interface includes circumferentially alternating projections and receptacles.

7. A fiber optic connector comprising:
    a connector body supporting six multi-fiber ferrules arranged consecutively in a row, the connector body defining a mechanical interface fully surrounding the six multi-fiber ferrules, the mechanical interface including circumferentially alternating projections and receptacles.

8. The fiber optic connector of claim 7, wherein the mechanical interface has first and second of the projections and first and second of the receptacles, the first and second projections being different sizes from each other and the first and second receptacles being different sizes from each other.

9. The fiber optic connector of claim 8, wherein the fiber optic connector is a first fiber optic connector, and wherein the mechanical interface is configured to mate with an identically configured mechanical interface of a second fiber optic connector in only one rotational orientation.

10. The fiber optic connector of claim 9, wherein the mechanical interface of the second fiber optic connector includes first and second projections and first and second receptacles, wherein the first and second projections and first and second receptacles of the mechanical interface of the first fiber optic connector are configured to mate, respectively, with the first and second receptacles and first and second projections of the mechanical interface of the second fiber optic connector.

11. The fiber optic connector of claim 10, wherein the mechanical interfaces of the first and second fiber optic connectors are configured to mate without the use of an intermediate fiber optic adapter.

* * * * *